(12) United States Patent
Itou et al.

(10) Patent No.: US 6,354,940 B1
(45) Date of Patent: Mar. 12, 2002

(54) GAME APPARATUS, GAME FIGHT PROCESSING METHOD, AND COMPUTER READABLE STORAGE MEDIUM STORAGE PROGRAM THEREFOR

(75) Inventors: Hiroyuki Itou, Honolulu, HI (US); Takatsugu Nakazawa, Tokyo (JP)

(73) Assignee: Square Co., Ltd., Tokyo (JP)

( * ) Notice: Subject to any disclaimer, the term of this patent is extended or adjusted under 35 U.S.C. 154(b) by 0 days.

(21) Appl. No.: 09/369,832

(22) Filed: Aug. 9, 1999

(30) Foreign Application Priority Data

Apr. 30, 1999 (JP) .......................................... 11-123261

(51) Int. Cl.[7] ............................................... A63F 13/00
(52) U.S. Cl. ................................ 463/8; 463/43; 463/29
(58) Field of Search ........................... 463/7, 8, 40, 41, 463/42, 43, 44, 23, 29, 31

(56) References Cited

U.S. PATENT DOCUMENTS

| | | | |
|---|---|---|---|
| 5,390,937 A | | 2/1995 | Sakaguchi et al. |
| RE35,314 E | * | 8/1996 | Logg |
| 5,649,862 A | | 7/1997 | Sakaguchi et al. |
| 5,805,784 A | * | 9/1998 | Crawford |
| 5,885,156 A | * | 3/1999 | Toyohara et al. |
| 5,931,734 A | * | 8/1999 | Nakatani et al. |
| 5,961,386 A | | 10/1999 | Sawaguchi |
| 5,984,786 A | * | 11/1999 | Ehrman |
| 6,009,458 A | * | 12/1999 | Hawkins et al. |
| 6,159,100 A | * | 12/2000 | Smith |
| 6,168,524 B1 | * | 1/2001 | Aoki et al. |

OTHER PUBLICATIONS

Final Doom, Instruction Manual, id Software, Inc. 1996.*
"Game Walker", Kadokawa Shoten Publishing Co., Ltd., Apr. 1, 1996, vol. 3–4, No. 18, pp. 26–27, with English partial translation.
"The Complete Final Fantasy VI", 1st Edition, NTT Publishing Co., Ltd., Sep., 1994, pp. 172–174, with English partial translation.

* cited by examiner

Primary Examiner—Michael O'Neill
(74) Attorney, Agent, or Firm—Greenblum & Bernstein P.L.C.

(57) ABSTRACT

A game apparatus displays, in response to a manual input, a table of additional abilities, such as a magic art, possessed by an enemy character on a display screen that presents a fight fought between a player character and an enemy character, selects any additional ability from among the additional abilities, acquires the ability from the enemy character as a player character's own ability, and stocks the acquired additional ability for future use, or uses, on the spot, the acquired additional ability as the player character's own ability upon acquisition, in response to a manual input.

10 Claims, 21 Drawing Sheets

FIG. 3

| ENEMIES 20a | ADDITIONAL ABILITIES 20b | | EFFECTS 20c |
|---|---|---|---|
| DINOSAUR | FIRE | (MAGIC) | DOES FIRE-CAUSED DAMAGE |
| | THUNDER | (MAGIC) | DOES THUNDER-CAUSED DAMAGE |
| MONSTER A | BLIZZARD | (MAGIC) | DOES ICE-CAUSED DAMAGE |
| | CARE | (MAGIC) | RECOVERS PHYSICAL POWER BY 50 POINTS |
| MONSTER B | THUNDER | (MAGIC) | DOES THUNDER-CAUSED DAMAGE |
| | DECODE | (MAGIC) | DECODES ENEMY'S ABILITY |
| | CURE | (MAGIC) | CURES STATUS ABNORMALITY |
| WITCH | HALVE | (MAGIC) | HALVE MAGIC ATTACK |
| | CONFUSE | (MAGIC) | MAKES CONFUSION |
| | REFLECT | (MAGIC) | REFLECTS MAGIC |
| SOLDIER | RECOVERER | (ITEM) | RECOVERS CONDITION FROM INABILITY OF FIGHT |
| | BEAST | (SUMMONED BEAST) | SUMMONS BEAST FIGHTING IN PLACE OF PLAYER CHARACTER |
| ...... | ...... | | ...... |

FIG. 4

| | | | | |
|---|---|---|---|---|
| 21a | OPPONENTS | NAMES | | |
| | | MONSTER A | | |
| | | MONSTER B | | |
| | | ⋮ | | |
| 21b | ADDTIONAL ABILITIES | NAMES | USE-PERMISSION FLAG | NUMBER OF TIMES OF USE |
| | | FIRE | 1 | 15 |
| | | THUNDER | 0 | - |
| | | BLIZZARD | 1 | 3 |
| | | DECODE | 1 | 6 |
| | | CARE | 1 | 20 |
| | | CURE | 0 | - |
| | | ⋮ | ⋮ | ⋮ |
| 21c | POSSESSIVE ITEMS | NAMES | NUMBER OF ITEMS | |
| | | RECOVERY MEDICINE | 8 | |
| | | SACRED WATER | 0 | |
| | | MAP | 2 | |
| | | TENT | 5 | |
| | | RECOVERER | 6 | |
| | | CURER | 0 | |
| | | RING | 0 | |
| | | ⋮ | ⋮ | |

FIG. 8

| NEXT ACTION | STOCK OF ADDITIONAL ABILITY |
|---|---|
| TYPE OF ADDITIONAL ABILITY | CURE |
| POSSIBILITY OF SUCCESS | 1 |
| NUMBER OF TIMES OF USE | 5 |

FIG. 9

| NEXT ACTION | RELEASE OF ADDITIONAL ABILITY |
|---|---|
| TYPE OF ADDITIONAL ABILITY | THUNDER |
| TARGET | MONSTER B |
| POSSIBILITY OF SUCCESS | 1 |

| NAMES OF GAME-ELEMENT IMAGES | WAITING-TIME DATA (COUNTER VALUE) |
|---|---|
| PLAYER CHARACTER | 50 |
| DINOSAUR | 78 |
| MONSTER A | 93 |
| MONSTER B | 46 |
| WITCH | 71 |
| ⋮ | ⋮ |

FIG. 19

| | | | |
|---|---|---|---|
| 32a<br>OPPONENTS AND PLAYER CHARACTER | NAMES | MEASURED TIME (COUNTER VALUE) | |
| | MONSTER A | 41 | |
| | MONSTER B | 23 | |
| | PLAYER CHARACTER | 36 | |
| | ⋮ | | |
| 32b<br>ADDTIONAL ABILITIES | NAMES | USE-PERMISSION FLAG | NUMBER OF TIMES OF USE |
| | FIRE | 1 | 15 |
| | THUNDER | 0 | - |
| | BLIZZARD | 1 | 3 |
| | DECODE | 1 | 6 |
| | CARE | 1 | 20 |
| | CURE | 0 | - |
| | ⋮ | ⋮ | ⋮ |
| 32c<br>POSSESSIVE ITEMS | NAMES | NUMBER OF ITEMS | |
| | RECOVERY MEDICINE | 8 | |
| | SACRED WATER | 0 | |
| | MAP | 2 | |
| | TENT | 5 | |
| | RECOVERER | 6 | |
| | CURER | 0 | |
| | RING | 0 | |
| | ⋮ | ⋮ | |

GAME APPARATUS, GAME FIGHT PROCESSING METHOD, AND COMPUTER READABLE STORAGE MEDIUM STORAGE PROGRAM THEREFOR

BACKGROUND OF THE INVENTION

The present invention relates to a game apparatus, a game fight processing method, and a computer readable storage medium storing a program for the method, for playing a fighting game fought between game characters on a display screen.

A diversity of video games is available. Among them, some video games present a fight fought on a display screen between game characters, i.e., a player character operated by a player and an enemy character controlled by a computer.

This type of video game permits the player character and the enemy character to take offensive or defensive actions in accordance with a manual input or an algorithm contained in a program for controlling the action of the game characters. In other words, the video game performs graphic display control, audio output control, and a fight arithmetic processing in accordance with actions which are commanded using ability values and various data, in an offense or a defense, preset for the player character and the enemy character.

Among them, some video games offer magic as an action executable by a game character. Magic is one ability a game character can possess, and introduces a variation in the progress of a battle. For example, the player character can attack the enemy character using magic or can enhance its defense capability against the enemy character.

Magic arts usable by the player character and the enemy character are registered and assigned beforehand to respective characters. To use a magic art, each character specifies a desired magic art from among the magic arts registered for itself.

To enhance the entertainment value of the video game and provide a strategic feature to a fight scene in the video game, a variety of ideas may be implemented in the manner of use of offensive and defensive abilities predetermined for the game characters, such as magic arts and items. Also, new ideas may be implemented in the manner of registration of a new ability assigned to the character.

SUMMARY OF THE INVENTION

It is an object of the present invention to provide a game apparatus, a game fight processing method, and a computer readable program therefor, for taking advantage of an ability of an enemy character as a player character's ability.

A game apparatus, in one aspect of the present invention, for playing a fighting game between game characters on a display screen, includes storage unit for storing fighting abilities on a per character basis, selecting unit for selecting, in response to a manual input, any fighting abilities from among the fighting abilities which are stored on a per character basis and are presented on the display screen, and display control unit which controls the displaying of a fight fought between the characters, using the fighting ability selected by the selecting unit.

Preferably, the game apparatus preferably further includes time measurement unit for measuring a duration of time throughout which the display control unit controls the display of the fight, and authorizing unit for authorizing each character to execute a fighting action when the time measured by the time measurement unit reaches the time predetermined for the character, wherein the selecting unit selects the ability in response to a manual input when the authorizing unit authorizes the character to execute the fighting action.

A game fight processing method, in another aspect of the present invention, for playing a fighting game between game characters on a display screen, includes a first step for displaying, in response to a manual input, fighting abilities which are stored beforehand on a per character basis, a second step for selecting, in response to a manual input, any fighting abilities from among the fighting abilities which are displayed in the first step, and a third step for controlling the displaying of a fight between the characters, using the fighting ability selected in the second step.

In the game fight processing method, the display of the fight may be controlled when any fighting ability is selected in the second step, or when any fight abilities selected in the second step are registered and then any fighting ability is then selected from the registered fighting abilities.

In the game fight processing method, the duration of time throughout which the displaying of the fight is controlled in the third step may be measured. When the time measured reaches the time predetermined for one character, the character is authorized to execute a fighting action. The selection of the fighting abilities may be performed in response to the manual input when the fighting action is authorized.

In yet another aspect of the present invention, a computer readable storage medium stores a program for causing a computer to execute a game fight processing method for playing a fighting game between game characters on a display screen. The program includes a first step for displaying, in response to a manual input, fighting abilities which are stored beforehand on a per character basis, a second step for selecting, in response to a manual input, any fighting abilities from among the fighting abilities which are displayed in the first step, and a third step for controlling the displaying of a fight between the characters, using the fighting ability selected in the second step.

In the storage medium, the display of the fight may be controlled when any fighting ability is selected in the second step, or when any fight abilities selected in the second step are registered and then any fighting ability is then selected from the registered fighting abilities.

In the storage medium, the duration of time throughout which the display of the fight is controlled in the third game may be measured. When the time measured reaches the time predetermined for one character, the character is authorized to execute a fighting action. The selection of the fighting abilities may be performed in response to the manual input when the fighting action is authorized.

In yet another aspect of the present invention, a computer data signal includes a carrier wave modulated with a program for causing a computer to execute a game fight processing method for playing a fighting game between game characters on a display screen. The program includes a first step for displaying, in response to a manual input, fighting abilities which are stored beforehand on a per character basis, a second step for selecting, in response to a manual input, any fighting abilities from among the fighting abilities which are displayed in the first step, and a third step for controlling the displaying of a fight between the characters, using the fighting ability selected in the second step.

In the computer data signal, the duration of time throughout which the display of the fight is controlled in third step may be measured. When the time measured reaches the time predetermined for one character, the character is authorized to execute a fighting action. The selection of the fighting abilities may be performed in response to the manual input when the fighting action is authorized.

A magic art may be a function of providing a variation to the ability of the character, and the above fighting ability may be a magic art.

Other purposes of this invention will be clarified by reference to the following detailed description of the preferred embodiments and claims based on the following attached figures.

BRIEF DESCRIPTION OF THE DRAWINGS

FIG. 3 shows the data structure of an additional-ability setting table stored in the RAM shown in FIG. 2;

FIG. 4 shows the data structure of a fight control table stored in the RAM shown in FIG. 2;

FIG. 8 shows the data structure of typical data registered in the RAM in the draw process;

FIG. 9 shows the data structure of typical data registered in the RAM in the draw process;

FIG. 19 shows the data structure of a fight control table stored in the RAM shown in FIG. 17;

DETAILED DESCRIPTION OF THE PREFERRED EMBODIMENTS

Figure 1:
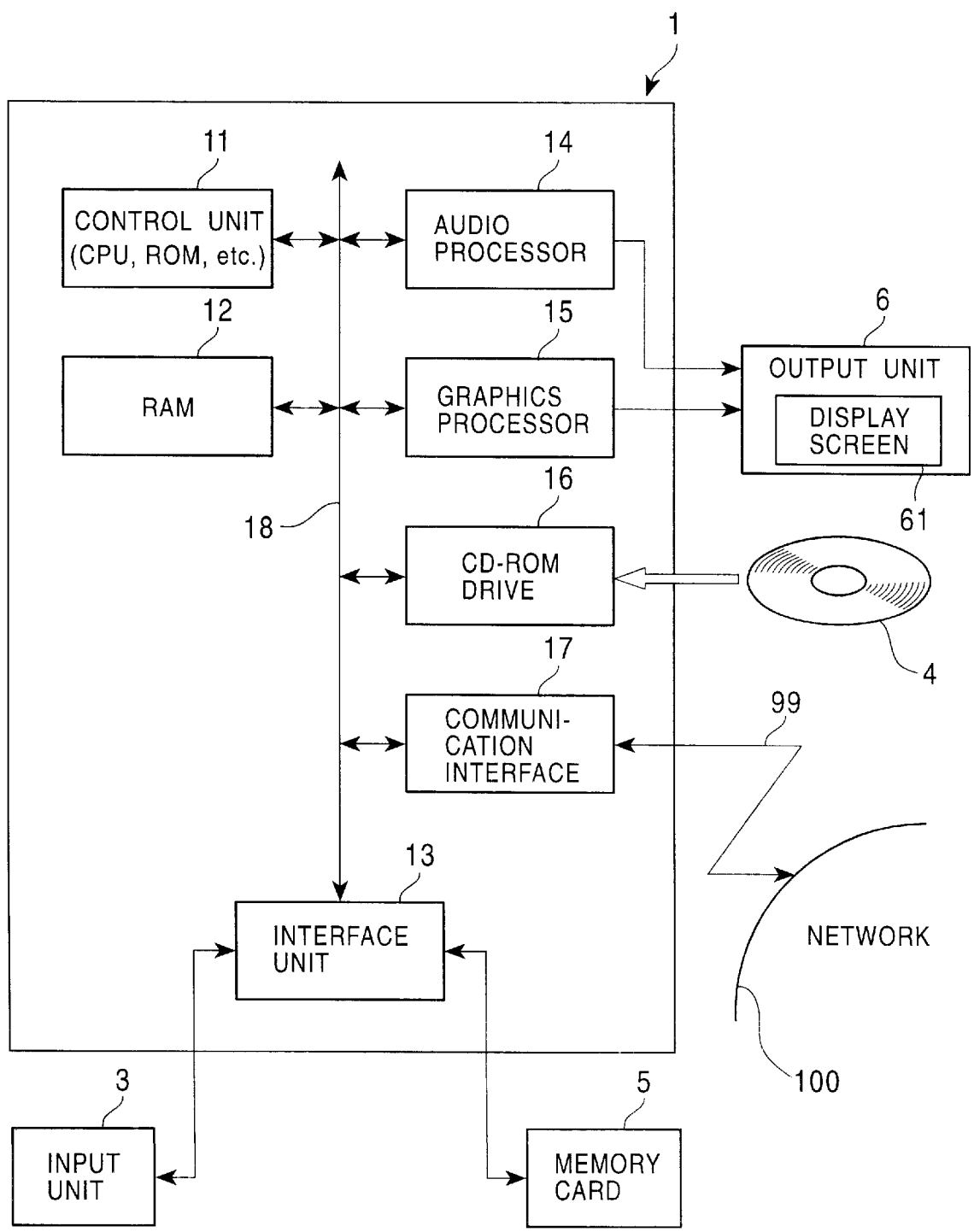
FIG. 1 is a block diagram generally showing a game apparatus of the present invention.

Embodiments of the present invention are now discussed, referring to the drawings. Discussed below is a home game apparatus, in which the present invention is applied, but the present invention is not limited to the home game apparatus.

(First Embodiment)

FIG. 1 is a block diagram generally showing a game apparatus 1 of the present invention.

The game apparatus 1 includes a game apparatus main unit 2 performing major functions of the game apparatus 1, an input unit (i.e., a controller) 3 for entering a manual input to the game apparatus main unit 2, a memory card 5 for storing data, such as game environment setting data and game progress data, and an output unit 6 for outputting a video image and sound in accordance with the content of a game, based on a video signal and an audio signal from the game apparatus main unit 2.

The game apparatus main unit 2 includes a controller unit 11, a RAM (Random Access Memory) 12, an interface unit 13, an audio processor 14, a graphics processor 15, a CD-ROM drive 16, a communication interface 17, and a bus 18 for interconnecting these units.

Loaded into and unloaded from the CD-ROM drive 16 is a storage medium 4, such as a CD-ROM (Compact Disc—Read Only Memory), which stores programs for performing game playing processes, video data and audio data.

The controller unit 11 is a circuit composed of a CPU (Central Processing Unit), a ROM (Read Only Memory), etc. The CPU controls each unit in accordance with programs stored in RAM 12 (or in ROM, as required). The controller unit 11, including an oscillator and a timer counter (both not shown), generates a clock signal in response to a timing signal regularly output from the oscillator, and performs time measurement by counting the clock signal through its counter.

The input unit 3 and the memory card 5 are detachably connected to the interface unit 13. The interface unit 13 controls data transfer between units connected to the bus 18 (particularly, the controller unit 11) and the input unit 3 or the memory card 5.

The audio processor 14 generates sound with effects, such as a BGM (Background Music) for a game. In response to a command from the controller unit 11, the audio processor 14 generates an audio signal using data stored in RAM 12, and outputs it to the output unit 6.

The graphics processor 15, including a frame buffer (not shown), draws a video image in response to the command from the controller unit 11, on the frame buffer. The graphics processor 15 generates a video signal to display the video data drawn onto the frame buffer and outputs the video signal to the output unit 6.

The CD-ROM drive 16 is a reading unit for reading data stored in a CD-ROM (storage medium 4). The game apparatus 1 performs control for a game playing by allowing the controller unit 11 to perform control in accordance with a game program stored in the CD-ROM.

The communication interface 17 performs communication control for data exchange between units on a network 100, and is connected to the network 100 through a communication line 99, as necessary.

Figure 2:
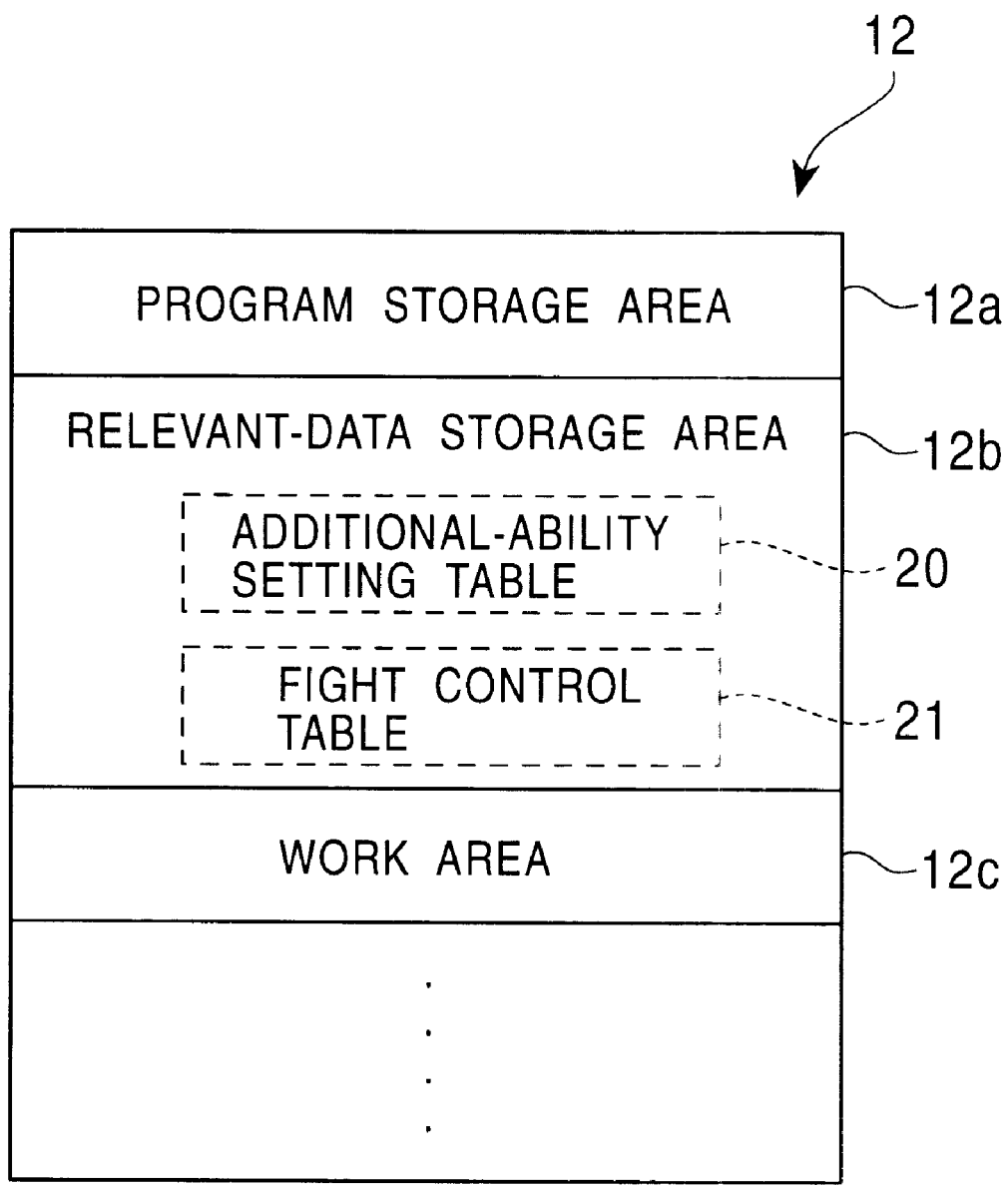
FIG. 2 shows a memory structure of a RAM in a first embodiment of the present invention.

FIG. 2 shows a memory structure of RAM 12 shown in FIG. 1. RAM 12 includes a program storage area 12a for storing programs to be executed by the controller unit 11, a relevant-data storage area 12b for storing data, required to execute various processes in the game, such as an additional-ability setting table 20 and a fight control table 21, to be discussed later, and a work area 12c.

FIG. 3 shows the data structure of the additional-ability setting table 20. The additional-ability setting table 20 stores the correspondence between the enemy character and the additional ability.

The additional ability refers to an ability to fight possessed by an enemy character, and a player character can acquire the additional ability by robbing the enemy character of the ability during a battle.

The additional ability is assigned to all enemy characters whom the player character may fight during the game. Such additional abilities include magic arts, items and summoned beasts.

In the game of this invention, the magic art is a function of providing a variation to the ability of each character. The item refers to a thing the character may use in an offensive or defensive action during a battle.

A summon refers to an action which is performed in response to a manual input to make another character (a summoned beast) participate in a battle between the characters, and the summoned beast refers to a character summoned to participate in the battle.

Referring to FIG. 3, the additional-ability setting table 20 is composed of an "enemy character" column 20a, an "additional ability" column 20b, and "effects" column 20c.

As shown, the "enemy character" column 20a holds names of enemy characters equipped with the additional abilities. In practice, a character identification number (i.e., character ID) unique to each enemy character may be stored. In the "additional ability" column 20b, the name of the additional ability set for each enemy character is stored. In practice, an additional ability identification number (additional ability ID) may be stored.

Referring to FIG. 3, the description of the effect of each ability is stored in the "effects" column 20c, but the "effects" column 20c may be dispensed with, in practice.

As shown, the "enemy character" column 20a stores "Dinosaur", "Monster A", "Monster B", "Witch", "Soldier", etc. The "additional ability" column 20b stores magic arts including "Fire", "Thunder", "Blizzard", "Care", etc.

Besides the magic arts, the "additional ability" column 20b stores items, such as "Recoverer", and summoned beasts, such as "Beast".

FIG. 4 shows the data structure of the fight control table 21 stored in the relevant-data storage area 12b shown in FIG. 2.

The fight control table 21 stores data required to control a battle, and is composed of an "opponent" section 21a, an "additional ability" section 21b, and a "possessive item" section 21c.

The "opponent" section 21a stores character names (character IDs) of at least one enemy character the player character fights in each battle. The controller unit 11 of the game apparatus 1 references the additional-ability setting table 20 shown in FIG. 3, in accordance with information in the "opponent" section 21a, and displays, on a fight screen, the opponent name and the name of the additional ability the player character can acquires from the opponent.

The "additional ability" section 21b holds the name of the additional ability acquired from the opponent, a use-permission flag for the additional ability, and a remaining number of times of use of the additional ability. All additional abilities the player character can acquire are set beforehand in the "additional ability" section 21b, and whether each additional ability is usable or not is determined by its respective use-permission flag.

Specifically, a usable additional ability has its use-permission flag set to "1", and an unusable additional ability has its use-permission flag reset to "0".

The remaining number of times of use increases as the player character acquires and accumulates the additional ability, but decreases as the player character uses the additional ability. The status as to whether each additional ability is usable or not may be set depending on the remaining number of times of use of the additional ability, rather than the use-permission flag. Specifically, when the remaining number of times of use is equal to or greater than one, the corresponding additional ability remains usable. When the remaining number of times of use is zero, the corresponding additional ability is unusable.

The "possessive item" section 21c holds the name of an item owned by the player character and the number of items. All items the player character can acquire are set beforehand in the "possessive item" section 21c, and the status as to whether each item is owned or not is set depending on possessive count information. Specifically, when the count information is equal to or greater than one, that item is owned, and when the count information is zero, that item is unowned.

In the same manner as in the status as to whether the additional ability is usable, the status of whether the item is owned or unowned can be managed using a flag.

In this embodiment, the fighting ability is stored on a per character basis, any stored ability is selected in response to a manual input, and the display control of the fight screen is controlled using the selected ability.

The operation of the game apparatus 1 of this embodiment is now specifically discussed.

At a startup, the controller unit 11 reads a program and data, required to execute a game, from the CD-ROM as the storage medium 4 through the CD-ROM drive 16, in accordance with the operating system stored in the internal ROM, and transfers them to RAM 12. The controller unit 11 performs the following processes by executing the program transferred to RAM 12.

The program and data, required to carry out the game, are successively read from the CD-ROM as the storage medium 4 in response to a command from the controller unit 11 in step with the progress of the game, and are transferred to RAM 12.

The discussion of the reading of the data from the CD-ROM and the transfer of the data to RAM 12 is omitted because these operations are not important in the context of the present invention.

Figure 5:
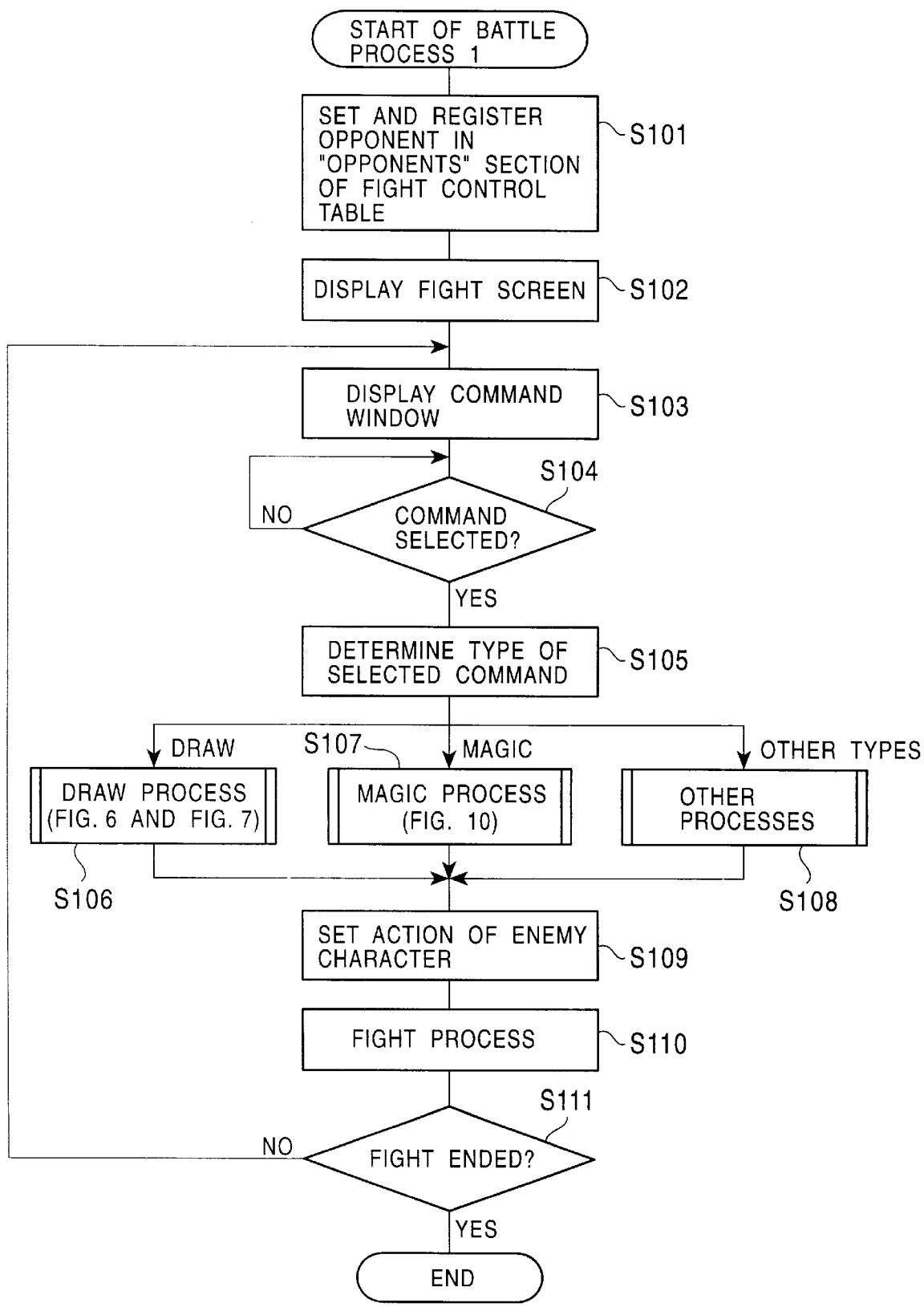
FIG. 5 is a flow diagram of a battle process in accordance with the first embodiment.

FIG. 5 is a flow diagram showing a battle process. The battle process is discussed, referring to the flow diagram shown in FIG. 5 and a display example shown in FIG. 11. A player character encounters an enemy character in the game with a predetermined probability. When both characters encounter, the battle process starts.

When the battle process starts, the controller unit 11 sets the opponent as shown in FIG. 5, and registers the opponent in the "opponent" section 21a in the fight control table 21 (step S101)

The controller unit 11 and the graphics processor 15 present the fight screen with a player character 81 and enemy characters 82 and 83 appearing thereon on a display screen 61 in the output unit 6 (step S102). Along with the display of the fight screen, the audio processor 14 outputs a predetermined sound from the output unit 6.

Figure 11:
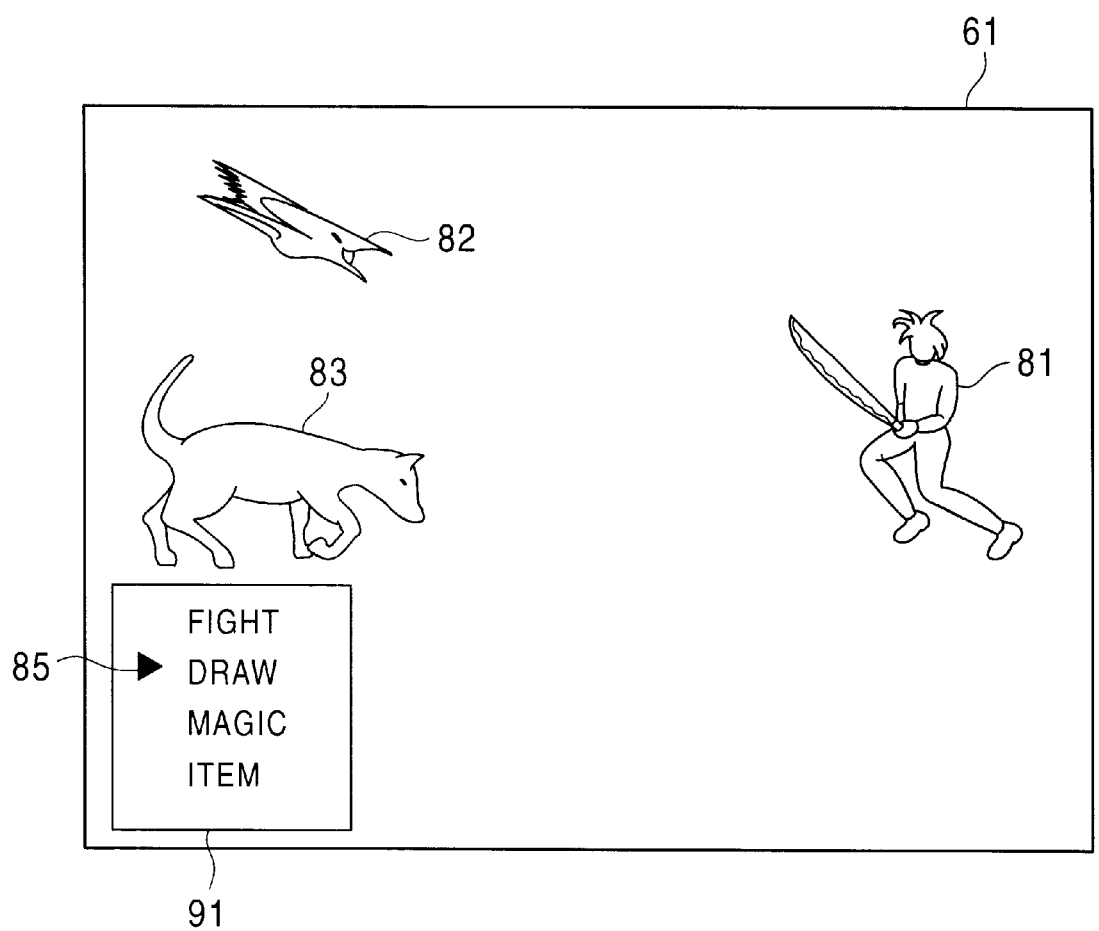
FIG. 11 shows one example of display presented in the battle process shown in FIG. 5.

The controller unit 11 and the graphics processor 15 present a command window 91 on the display screen 61 (step S103). Referring to FIG. 11, the command window 91 is presented along with the player character 81, the enemy character 82 (i.e., monster A), and the enemy character 83 (i.e., monster B) on the display screen 61.

The command window 91 lists commands including "fight", "draw", "magic", and "item". The player moves an icon 85 presented within the command window 91 by pressing buttons on the input unit 3, and selects any command listed within the command window 91.

Returning to FIG. 5, the controller unit 11 remains on standby until the player selects any command by moving the icon 85 in the cursor operation (step S104). When any command is selected, the controller unit 11 determines whether the selected command is "draw", "magic", or any other process (step S105).

When the "draw" command is selected by the player in the cursor operation, for example, a draw process routine is performed, in which the player character acquires the additional ability, such as a magic art, from the enemy character, then executes or saves it (step S106).

When the "magic" command is selected, a magic process is performed, in which the player executes an additional ability the player character has in stock (step S107). The draw process and the magic process will be detailed later.

When one of the other processes, such as "fight" and "item" commands, is selected, the process relating to the use of the item or the process for a fight (attack) using available weapons is executed (step S108). In the process relating to the use of the item, a list of information in the "possessive item" section 21c of the fight control table 21 is presented on the display screen 61, and a setting for using a selected item is performed.

Upon completing the process for the command selected by the player, the controller unit 11 sets the action of the enemy character in accordance with an action setting algorithm (sub-program) of the enemy contained in the game program (step S109).

The controller unit 11, graphics processor 15, and audio processor 14 execute graphic display control, audio output control, and fight arithmetic processing in accordance with actions set for the player character and enemy characters, thereby performing a fight process (step S110).

In succession, the controller unit 11 determines whether the fight has ended (step S111). For example, the fight ends when the player character is damaged by the enemy in excess of a predetermined degree of damage, with its hit point (HP) reduced to zero, when the player character has attacked, given damage in excess of a predetermined degree and completely perished the enemy characters, or when the player evades the fight, i.e., enters a manual input to escape.

When the fight is incomplete, i.e., when the fight is continued, the controller unit 11 returns to the displaying of the command window in step S103 to repeat the subsequent steps.

Figure 6:
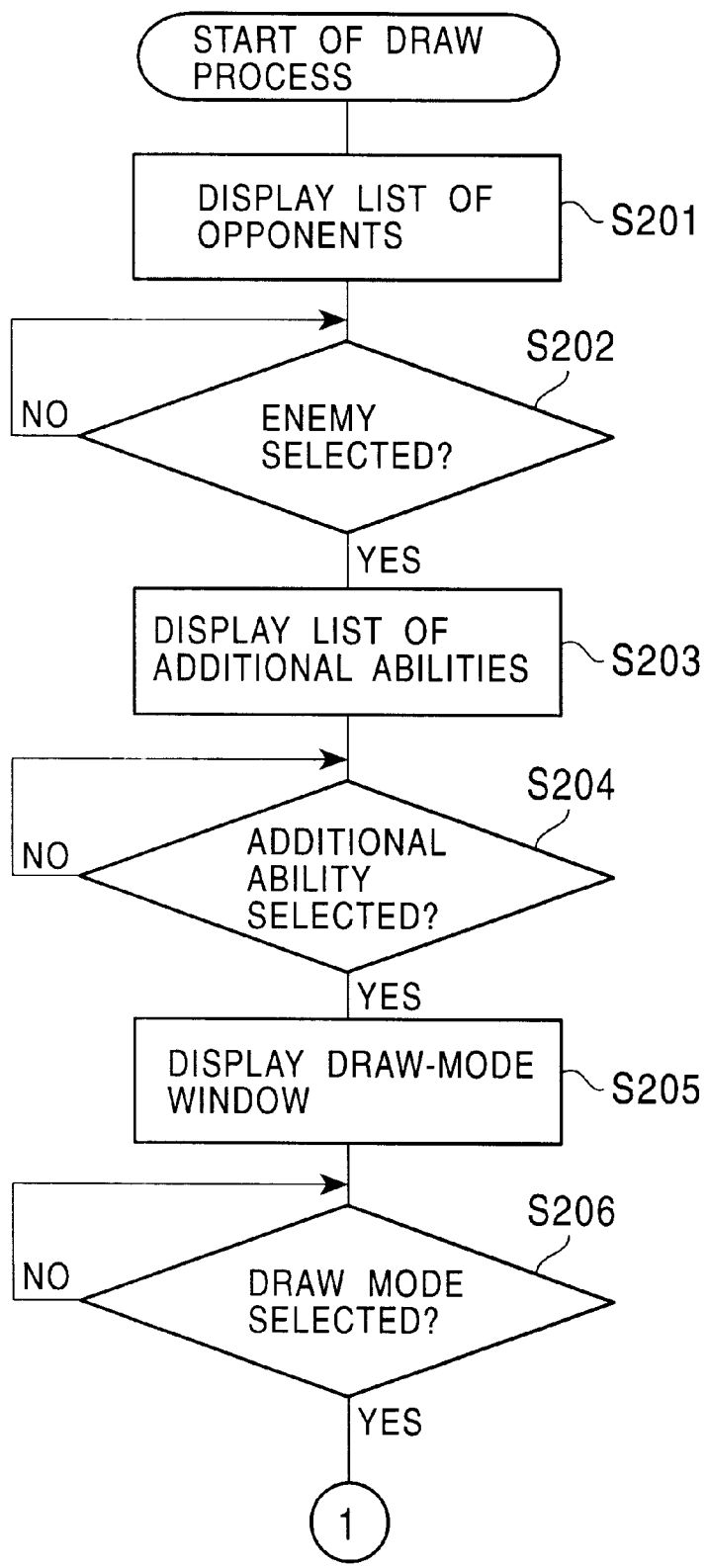
FIG. 6 is a flow diagram of a draw process executed in the battle process shown in FIG. 5.
Figure 7:
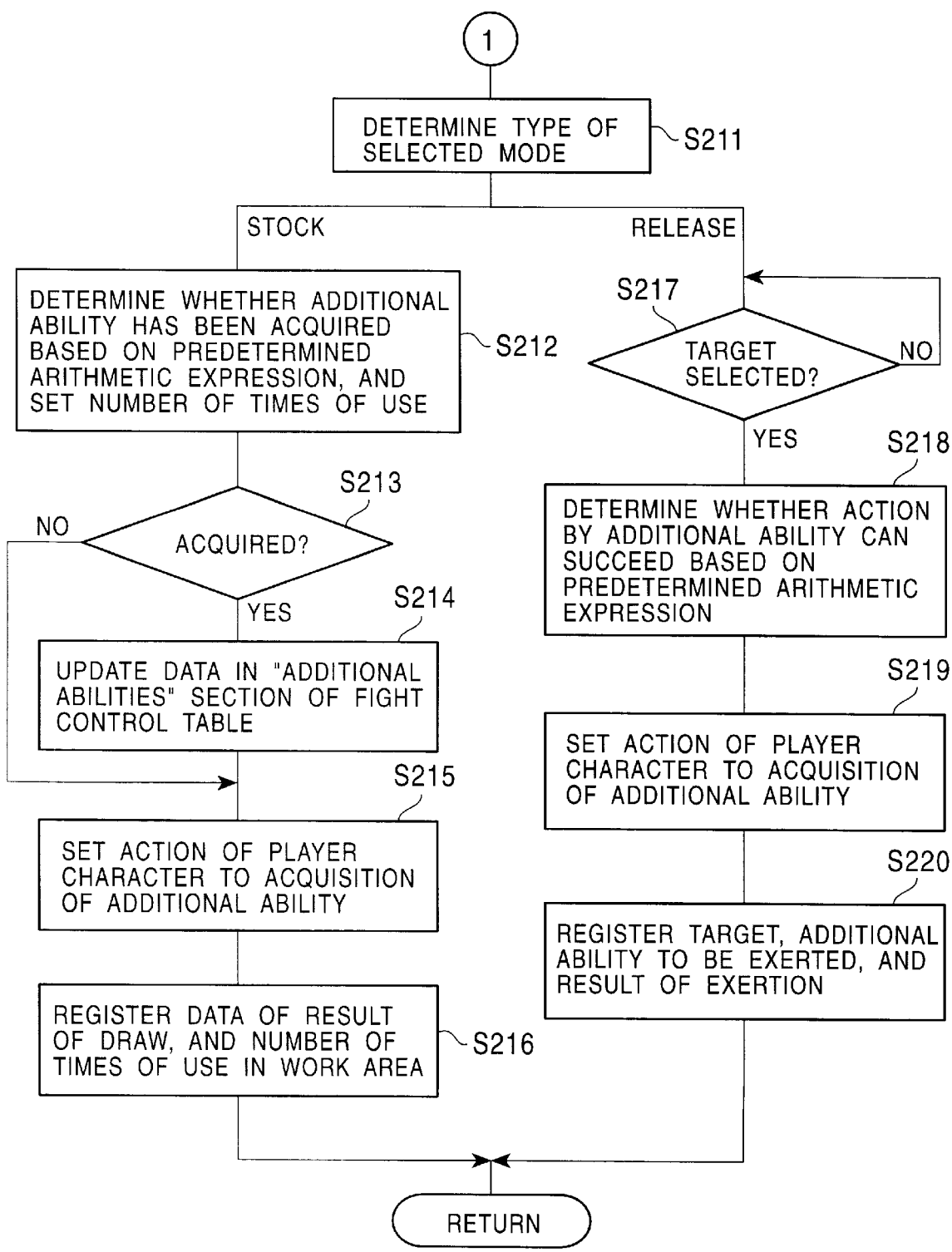
FIG. 7 is a continuation of the flow diagram of FIG. 6.

The draw process executed in step S106 in FIG. 5 is now discussed, referring to FIGS. 6 through FIG. 9, and FIG. 12 through FIG. 14. FIG. 6 and FIG. 7 are flow diagrams of the draw process executed by the controller unit 11 shown in FIG. 1.

Figure 12:
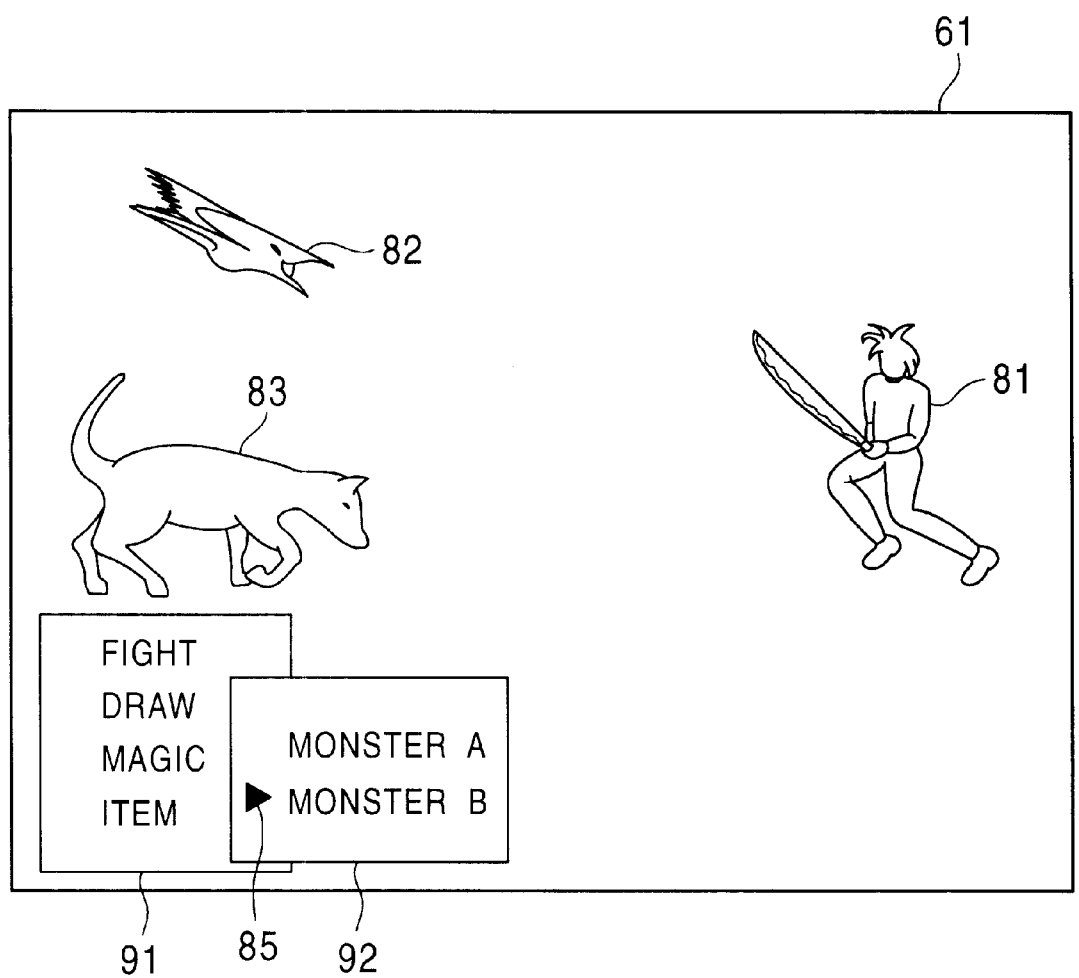
FIG. 12 shows another example of display presented in the battle process shown in FIG. 5.
Figure 13:
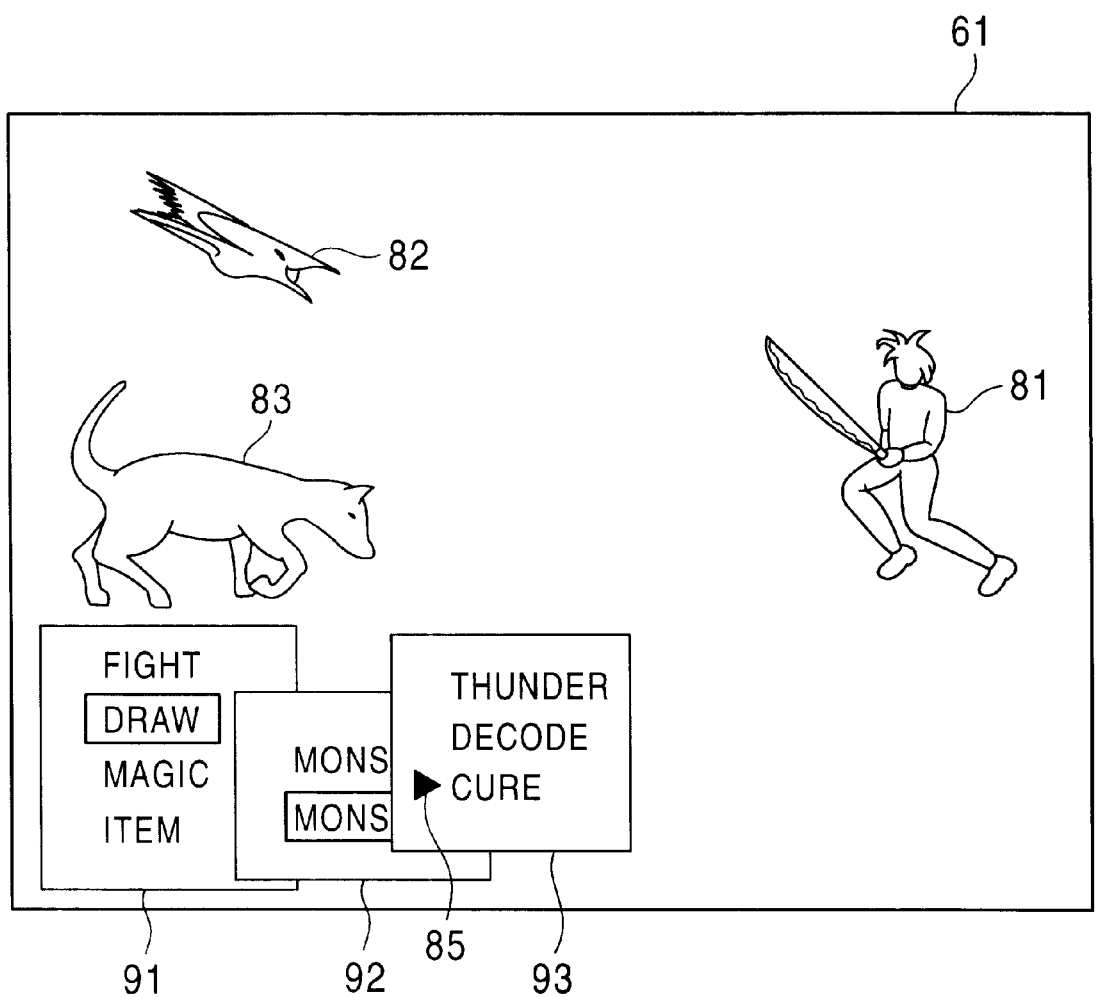
FIG. 13 shows yet another example of display presented in the battle process shown in FIG. 5.
Figure 14:
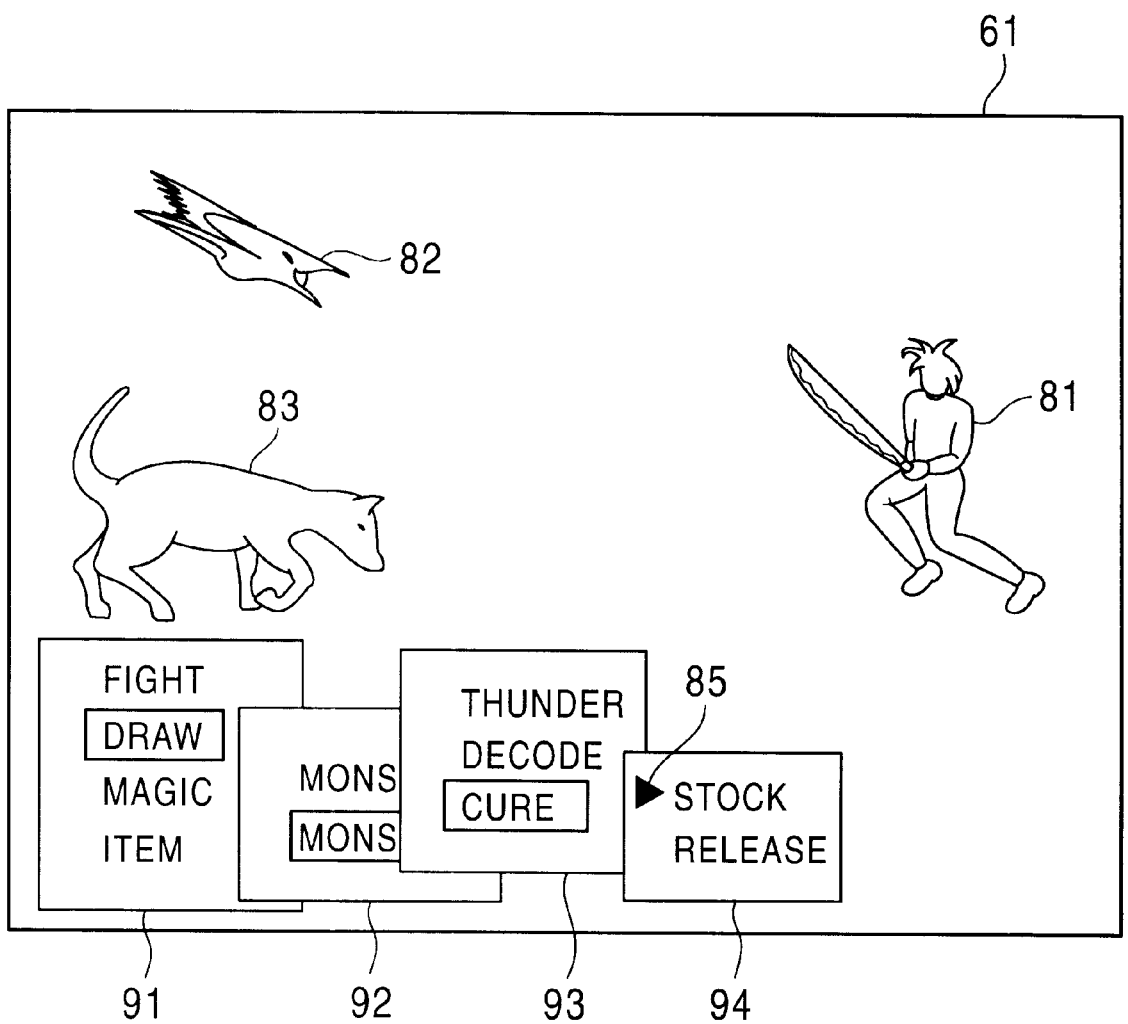
FIG. 14 shows yet another example of display presented in the battle process shown in FIG. 5.

FIG. 8 and FIG. 9 show data structures showing examples of data registered in the work area 12c of RAM 12. FIG. 12 through FIG. 14 are display examples in the draw process.

When the draw process starts, the controller unit 11 references the "opponent" section 21a in the fight control table 21 (see FIG. 4), and acquires the name of the opponent (or character ID).

The controller unit 11 and graphics processor 15 present a specifying-opponent window 92 on the display screen 61, and gives a list of enemy characters within the window (step S201).

FIG. 12 shows the window example in which the specifying-opponent window 92 is displayed on the display screen 61.

In this display example, the opponents of the player character 81 are two enemy characters 82 and 83, namely, monster A and monster B, and the two enemy character names, "monster A" and "monster B" are displayed within the specifying-opponent window 92.

The player now moves the icon 85 presented within the specifying-opponent window 92 by manipulating the buttons on the input unit 3, and selects any enemy character from the specifying-opponent window 92. Returning to FIG. 6, the controller unit 11 remains on standby until the player selects the enemy character in the cursor operation (step S202).

When the enemy character is selected in step S202, the controller unit 11 references the additional-ability setting table 20 (see FIG. 3), and acquires the additional ability associated with the selected enemy character.

The controller unit 11 and graphics processor 15 present an additional ability window 93 on the display screen 61, and gives, within the additional ability window 93, a list of additional abilities associated with the selected enemy character (step S203).

FIG. 13 shows a display example in which the additional ability window 93 is presented on the display screen 61. In this display example, the enemy character 83, or the monster B, is equipped with three additional abilities: "thunder", "decode", and "cure" (see FIG. 3), and the additional ability window 93 lists the three additional ability names of "thunder", "decode", and "cure".

In this display state, the player moves the icon 85 within the additional ability window 93 by manipulating the buttons on the input unit 3, and selects any additional ability from the additional ability window 93.

Returning to FIG. 6, the controller unit 11 remains on standby until the player selects the additional ability by moving the icon 85 in the cursor operation (step S204).

When the additional ability is selected in step S204, the controller unit 11 and graphics processor 15 present a draw process window 94 on the display screen 61 (step S205). FIG. 14 shows a display example, in which the draw process window 94 is displayed on the display screen 61.

Two draw modes, namely, "stock" and "release" modes, are available. In the stock draw mode, the player character acquires the additional ability from the enemy character and save the additional ability rather than using it on the spot. In the release draw mode, the player character uses the additional ability on the spot immediately after gaining it. The draw modes, "stock" and "release", are listed in the display example shown in FIG. 14.

The draw mode "release" means that once gained additional ability is immediately used on the spot. In this embodiment, however, the player character influences the enemy character into executing the additional ability in the release draw process, rather than executing the additional ability after gaining it as its own additional ability in the release draw process. Alternatively, the player character may execute the additional ability, after robbing the enemy character of the additional ability as its own.

In this display state, the player moves the icon 85 within the draw process window 94 by manipulating the buttons on the input unit 3, and selects either "stock" or "release" from the draw process window 94. Returning to FIG. 6, the controller unit 11 remains standby until the player selects the draw process by moving the icon 85 in the cursor operation (step S206).

When the draw mode is selected in step S206, the controller unit 11 goes to step S211 shown in FIG. 7, and determines whether the selected draw mode is the stock mode or the release mode.

When the stock mode is selected, the controller unit 11 performs calculation by placing, into a predetermined arithmetic expression, parameters, such as a growth stage and magic power, of the player character and the enemy character (to whom the draw process is performed) selected in step S202 in FIG. 6.

Based on the calculation result, the controller unit 11 determines the possibility of acquisition of the additional ability selected in step S204 in FIG. 6, and sets the number of times of use as a result of acquisition of the additional ability (step S212).

The acquisition of the additional ability is hereinafter referred to as a "draw" of the additional ability, and the acquired additional ability is a "drawn additional ability". The number of times of use may be a number derived from a table of random numbers.

When the draw is successful (step S213), the controller unit 11 updates data stored in the fight control table 21 (step S214).

Specifically, a new additional ability having its use-permission flag set to "0" in the fight control table 21 is drawn, the controller unit 11 sets the flag from "0" to "1" and registers the number of times of use.

When the additional ability already in stock, namely, having its use-permission flag set to "1" in the fight control table 21 is drawn, the controller unit 11 adds the data of number of times of use to the remaining number of times of use in the fight control table 21. When an item is acquired, the controller unit 11 registers the item in the "possessive item" section 21c in the fight control table 21.

In succession, the controller unit 11 sets the action of the player character to the acquisition of the additional ability (step S215), and registers data of the result of the draw and the number of times of use of the additional ability in the work area 12c of RAM 12 (step S216).

In accordance with the data set here, the graphic display control, the audio output control and the fight arithmetic processing are performed in step S110 for the fight process shown in FIG. 5.

Since the displaying of the player character to acquire the additional ability, and the displaying of the result of the draw and of the number of times of use are performed in step S110 shown in FIG. 5, data relating to these is set in step S215 and step S216.

Referring to FIG. 8, a "stock of additional ability" is stored in a "next action" section and the name of an additional ability to be drawn (e.g. "cure" as shown) is stored in a "type of additional ability" section in the work area 12c (data 22 to be registered) in step S215 and step S216. Furthermore, a flag is set in a "possibility of success" section, and a value indicating the number of times of use of the additional ability the player character gains through the draw is set in a "number of times of use" section. A flag of "1" represents a success, while a flag of "0" represents a failure.

An updated number of times of use resulting from a draw is any number within a range from 0 to 9. In the "next action" section, a flag may be stored.

Specifically, a "next action" flag may be "1" for the stock, while the "next action" flag maybe "0" for the other action, namely, for the release. In the "type of additional ability", the ID of the additional ability may be stored.

Returning to FIG. 7, the data registration is completed in step S216, and the controller unit 11 returns to step S109 in the battle process shown in FIG. 5 to set the action of the enemy character. In step S110, the fight process is carried out in accordance with the data 22 having the structure shown in FIG. 8 and the action setting data of the enemy character.

Figure 15:
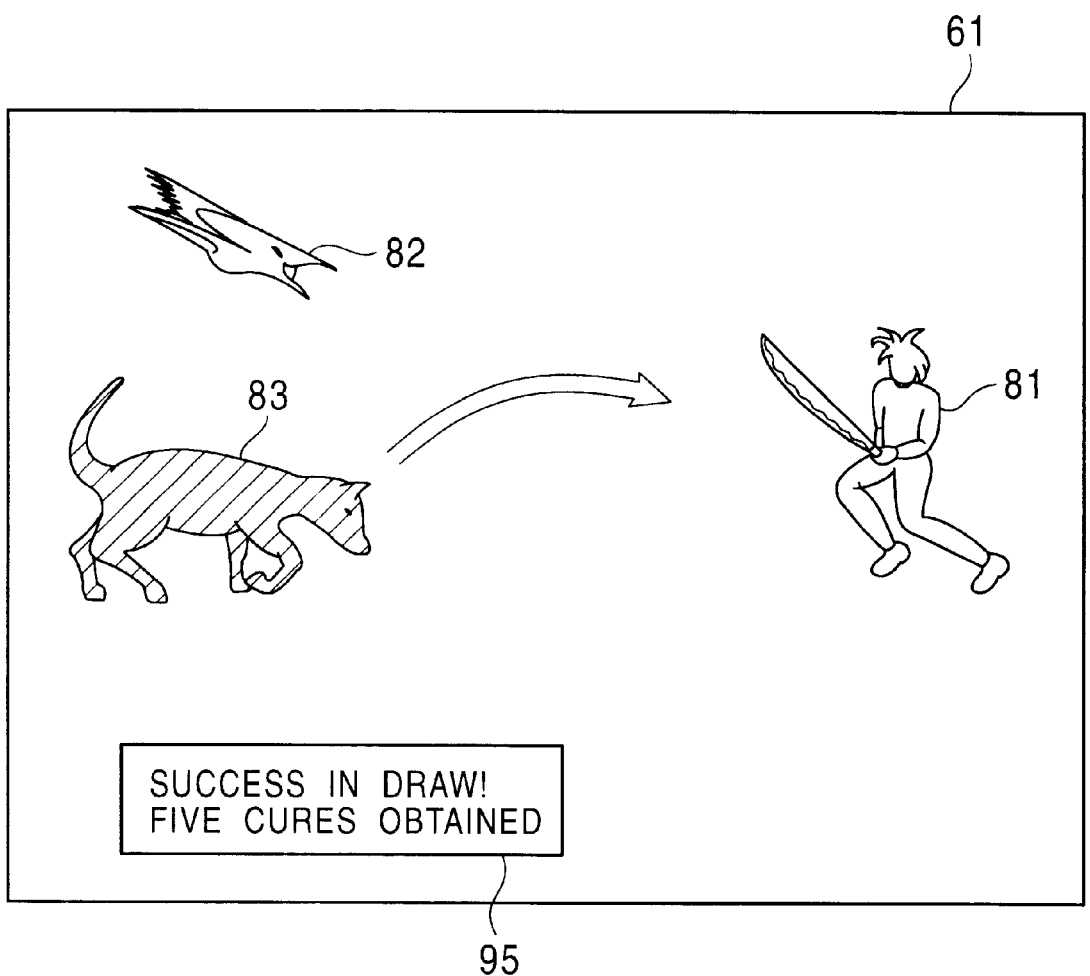
FIG. 15 shows yet another example of display presented in the battle process shown in FIG. 5.

FIG. 15 is a display example of a fight screen in which the stock mode is selected in the draw process. A message window 95 for indicating the result of the draw is presented on the display screen 61. When the draw operation is a success, the message window 95 displays the newly gained number of times of use as a result of a drawn additional ability.

As shown, the message window 95 gives a message "SUCCESS IN DRAW! FIVE CURES OBTAINED". On the display screen 61, the image of the enemy character 83 (monster B), namely, an object to be drawn, is flashed while an arrow-headed mark extending from the monster B to the player character 81 is presented.

When the determination in step S211 reveals that the selected draw mode is the release, the controller unit 11 and graphics processor 15 present again the specifying-opponent window 92 on the display screen 61 when the additional ability selected in step S204 shown in FIG. 6 is offensive, and display a table of enemy characters within the specifying-opponent window 92.

In this display state, the player moves the icon within the specifying-opponent window 92 by manipulating the buttons on the input unit 3 and selects an icon of an enemy character against which the additional ability is exerted (i.e., a target to attack).

When the additional ability selected in step S204 is defensive, the controller unit 11 and graphics processor 15 display a player character which is protected exerting the additional ability (i.e., a target to defend) on the specifying-opponent window 92.

In this display state, the player selects the player character, namely, an object to defend, by manipulating the buttons on the input unit 3. The controller unit 11 remains on standby until the player selects the enemy character against which the additional ability is exerted or the player character for which the additional ability is exerted (step S217).

When the target to attack or defend with the additional ability is selected, the controller unit 11 performs calculation placing the parameter values, such as a growth stage and magic power, of the player character and the target selected in step S217, into a predetermined arithmetic expression.

Based on the calculation result, the controller unit 11 determines whether the offensive action or defensive action with the additional ability selected in step S204 in FIG. 6 being exerted is successful (step S218).

In succession, the controller unit 11 sets the action of the player character to the exertion of the additional ability (step S219), and registers, in the work area 12c of RAM 12, the data of the target, and data of the additional ability to be exerted and of a success/failure of the exerted additional ability (step S220) In accordance with the data set here, the graphic display control, the audio output control and the fight arithmetic processing are performed in step S110 for the fight process shown in FIG. 5.

Since the action of the player character and the enemy character as the target in response to the exertion of the additional ability and the data of the success/failure of the exertion of the additional ability as a guidance are displayed in step S110 in FIG. 5, data relating to these is set in step S219 and step S220.

Referring to FIG. 9, a "release of additional ability" is stored in a "next action" section and the name of an additional ability (e.g., "thunder" as shown) is stored in a "type of additional ability" section in the work area 12c (data 23 to be registered) in step S219 and step S220. The character name of the target (e.g., "monster B" as shown) is stored in a "target" section, and a flag is stored in a "possibility of success" section.

In the "possibility of success" section, a flag of "1" represents a success, while a flag of "0" represents a failure.

As already discussed with reference to FIG. 8, a flag may be stored in the "next action" section.

An additional ability ID and a character ID can be respectively stored in the "type of additional ability" section and the "target" section.

Returning to FIG. 7, the data registration is completed in step S220. The controller unit 11 returns to the battle process in FIG. 5 to set the action of the enemy character in step S109.

Figure 16:
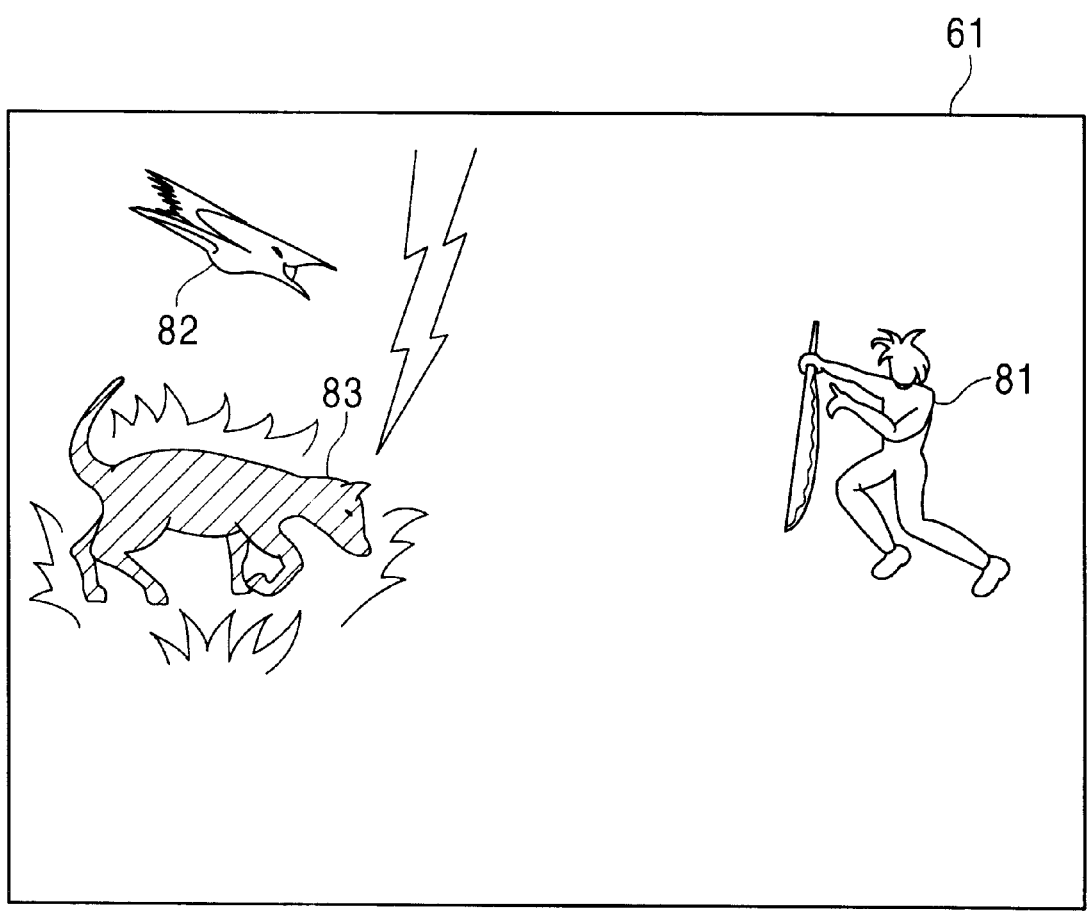
FIG. 16 shows yet another example of display presented in the battle process shown in FIG. 5.

In step S110, the fight process is carried out in accordance with the data 23 having the structure shown in FIG. 9 and the action setting data of the enemy character. FIG. 16 is a display example of a fight screen in which the release is selected in the draw process.

As shown, the additional ability "thunder" is exerted against the enemy character 83, namely, the monster B. On the display screen 61, the player character 81 makes a gesture of casting a spell on the monster B. As a result, the monster B is thunder-struck, and paralyzed. When the draw mode is the release, no change is caused in the number of times of use of the additional ability by the player character.

Figure 10:
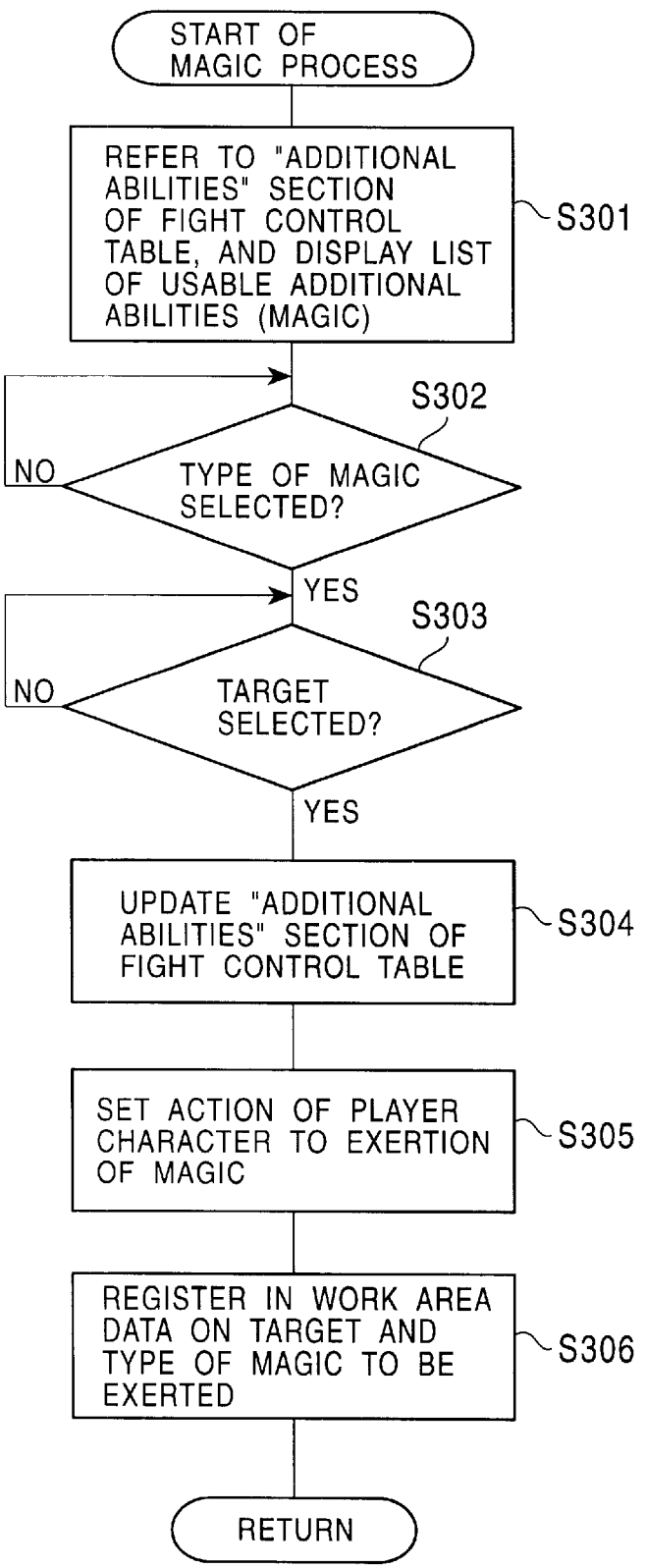
FIG. 10 is a flow diagram of a magic process executed in the battle process shown in FIG. 5.

The magic process executed in step S107 shown in FIG. 5 is now discussed, referring to FIG. 10. FIG. 10 is a flow diagram of the magic process executed by the controller unit 11 shown in FIG. 1.

When the magic process is initiated, the controller unit 11 references the "additional ability" section 21b in the fight control table 21 (see FIG. 4), and acquires the name (or ID) of the additional ability (magic) the player character can use.

The controller unit 11 and graphics processor 15 present a table of usable magic arts on the display screen 61 (step S301). In this display state, the player selects any magic art by moving an icon presented on screen with the buttons on the input unit 3. The controller unit 11 remains on standby until the player selects the magic art by moving the icon in the cursor operation (step S302).

When the magic art is selected, the controller unit 11 and graphics processor 15 present again the specifying-opponent window 92 on the display screen 61 if the selected magic art is offensive, and display a table of enemy characters in the specifying-opponent window 92.

In this display state, the player selects the target to attack, against which the magic art is exerted, by moving the icon within the specifying-opponent window 92 with the buttons on the input unit 3. When the selected magic art is defensive, the controller unit 11 and graphics processor 15 display the player character, as a target to defend with the magic art exerted, on the window.

In this display state, the player selects the player character which is set as a target to defend, by manipulating the buttons on the input unit 3. The controller unit 11 remains on standby until the player selects the player character or the enemy character, as an object to which the magic art is exerted (step S303).

When the targets are selected, the controller unit 11 updates the data stored in the "additional ability" section 21b in fight control table 21 (step S304). Specifically, the controller unit 11 decrements the remaining number of times of use of the magic art selected in step S302 by one.

When the remaining number of times of use becomes zero, the use-permission flag of the magic art is reset from "1" to "0". The magic art cannot be used any longer unless the magic art is stocked in a new draw action.

Upon updating the data, the controller unit 11 sets the action of the player character to the exertion of the magic art (step S305), and registers the data of the targets and of the magic art to be exerted into the work area 12c in RAM 12 (step S306). Based on the data registered here, the graphic display control, the audio output control and the fight arithmetic processing are performed in step S110 for the fight process shown in FIG. 5.

Since the action of the player character and the enemy character as the target in response to the exertion of the magic art and the data of the success/failure of the exertion of the magic art as a guidance are displayed in step S110 in FIG. 5, data relating to these is set in step S305 and step S306.

Upon registering the data in step S220, the controller unit 11 returns to the battle process shown in FIG. 5 to set the action of the enemy in step S109 and to perform the fight process in step S110.

In this embodiment, preferably, the data registered in the work area 12c in RAM 12 in the stock and release modes of the draw process and in the magic process, namely, data 22 and 23 respectively shown in FIG. 8 and FIG. 9, and data (not shown) registered in step S305 and S306 are stored in predetermined memory areas starting the same address.

In this embodiment, the fight process in step S110 shown in FIG. 5 is carried out with the action setting data of the player character read from the predetermined memory area of the work area 12c.

The predetermined memory area, in which the action setting data of the player character is stored, is cleared when it is determined in step S111 whether the fight process has ended.

The data 22 and 23, respectively shown in FIG. 8 and FIG. 9, and the data (not shown) registered in step S305 and step S306, are stored in different memory areas in the work area 12c.

Alternatively, in step S110 shown in FIG. 5, the case for the stock mode in the draw process, the case for the release mode in the draw process and the case for the magic process may be separated, and the data relating to each case is read from a separate memory area.

In the first embodiment of the present invention, the player draws the additional ability of the enemy character using the player character through the draw process, and stocks it for later use or releases it immediately subsequent to the draw of the additional character.

The player thus plays the game taking advantage of the ability of the enemy character as the player character's own ability, enjoying variation in the progress of the game. The entertainment value of the game is thus greatly enhanced.

(Second Embodiment)

A second embodiment of the present invention is now discussed. The differences between the first embodiment and the second embodiment are as follows: the second embodiment controls, during a fight session, the time from when each character has executed one action to when the character starts executing a next action, and the time from when each character has executed one action to when the player instructs the character to take a next action.

Figures 17, 18:
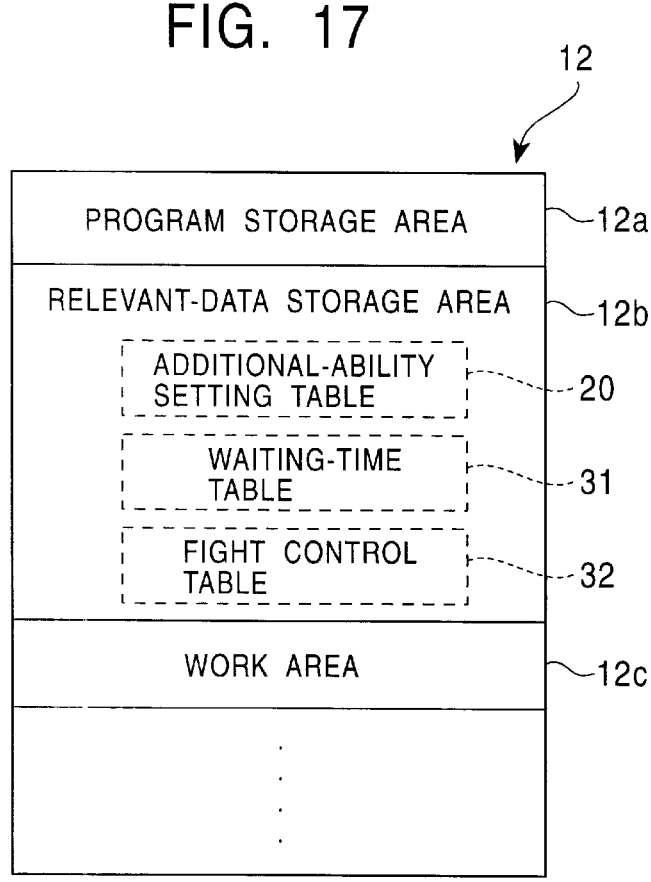
FIG. 17 shows the memory structure of a RAM in a second embodiment of the present invention.
FIG. 18 shows the data structure of a waiting time table stored in the RAM shown in FIG. 17.

In the second embodiment, time is thus accounted for in the factors that control the action of each character during a fight session. Referring to FIG. 17, the second embodiment is different from the first embodiment in that a waiting-time table 31 is stored in the relevant-data storage area 12b, that a fight control table 32 for holding time measurement data is used, and that a determination is performed of the start of time measurement, and of whether the measured time reaches the time set for each character.

The remaining construction and functions are identical to those of the above-referenced first embodiment, and the discussion about them is not repeated here. The hardware structure of the game apparatus 1 and the additional-ability setting table 20 remain unchanged from those of the first embodiment. The following discussion focuses on the difference between the first and second embodiments.

FIG. 17 shows a memory structure of RAM 12 in the second embodiment. The waiting-time table 31 is stored in the relevant-data storage area 12b in RAM 12. FIG. 18 shows a data structure of the waiting-time table 31.

The waiting-time table 31 holds a set value of the time from when each character in the game has completed one action and to when the character starts executing a next action (hereinafter referred to as a "waiting time").

The set value of the waiting time is a count at a timer counter, each unit count corresponding to a predetermined unit time. The game program sets the waiting time for each character.

The waiting-time table 31 includes a "name of game-element image" column 31a for holding the player character name and the enemy character names (or character IDs), and a "waiting-time data" column 31b for holding the set value of the waiting time of each character.

The set value of the waiting time may be the time from when each character has executed one action to when the player instructs the character to execute a next action.

FIG. 19 shows a data structure of the fight control table 32. The fight control table 32 stores data required to control a fight, and for example, includes an "opponent and player character" section 32a, an "additional ability" section 32b, and a "possessive item" section 32c.

The "opponent and player character" section 32a holds the name of the player character and the name of at least one enemy character (or character ID), while holding, in its "measured time" column, time data being counted, for each of the player character and opponents.

The "additional ability" section 32b and the "possessive item" section 32c respectively remain identical the "additional ability" section 21b and the "possessive item" section 21c in the first embodiment, and the discussion about them is not repeated.

The battle process in the second embodiment is now discussed. In the same manner as in the first embodiment, at a startup, the controller unit 11 reads a program and data, required to execute a game, from the CD-ROM as the storage medium 4 through the CD-ROM drive 16, in accordance with the operating system stored in the internal ROM, and transfers them to RAM 12.

The controller unit 11 performs the following processes by executing the program transferred to RAM 12. The discussion of the reading of the data from the CD-ROM and the transfer of the data to RAM 12 is omitted because these operations are not important in the context of the present invention.

Figure 20:
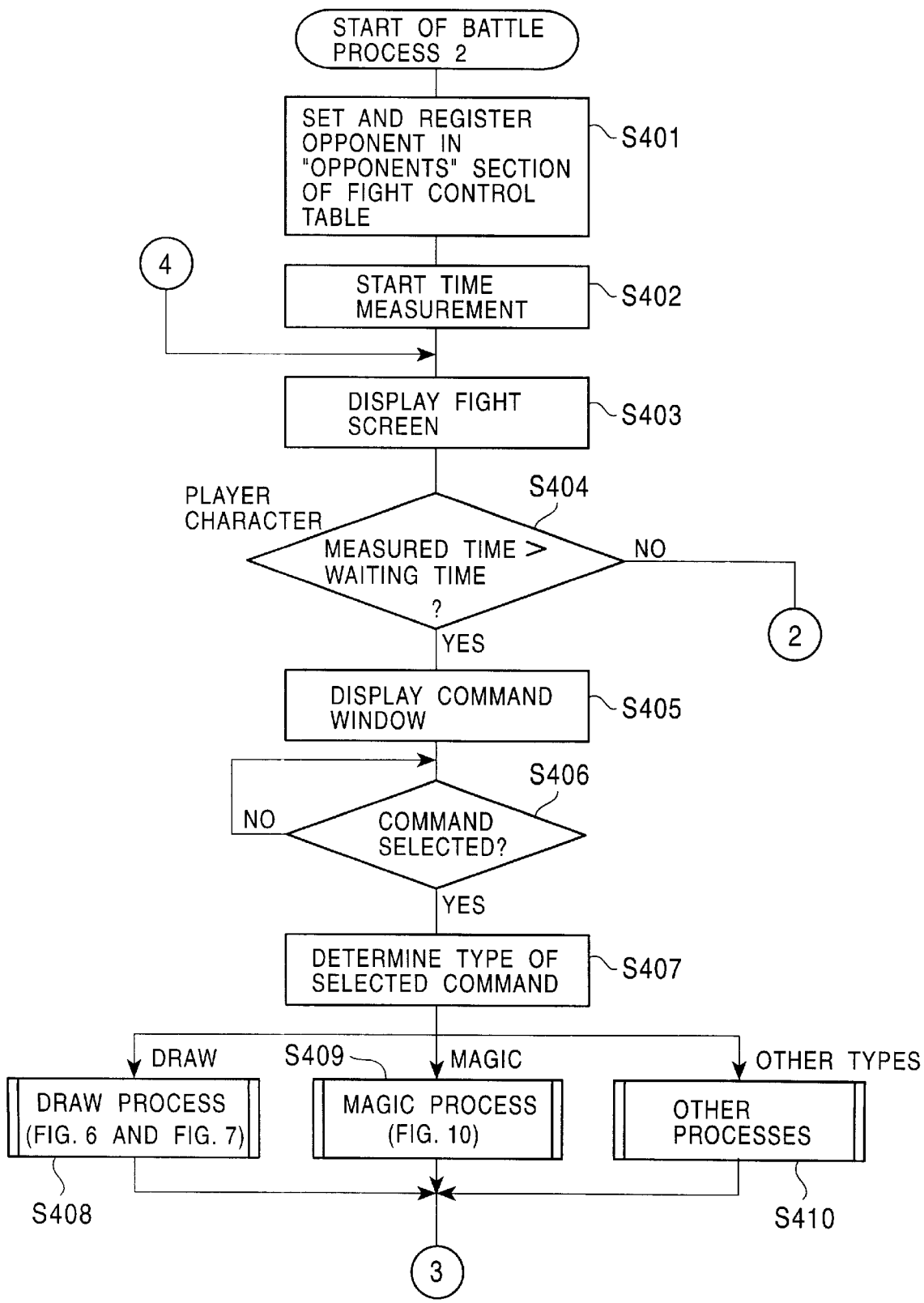
FIG. 20 is a flow diagram of a battle process in the second embodiment of the present invention.
Figure 21:
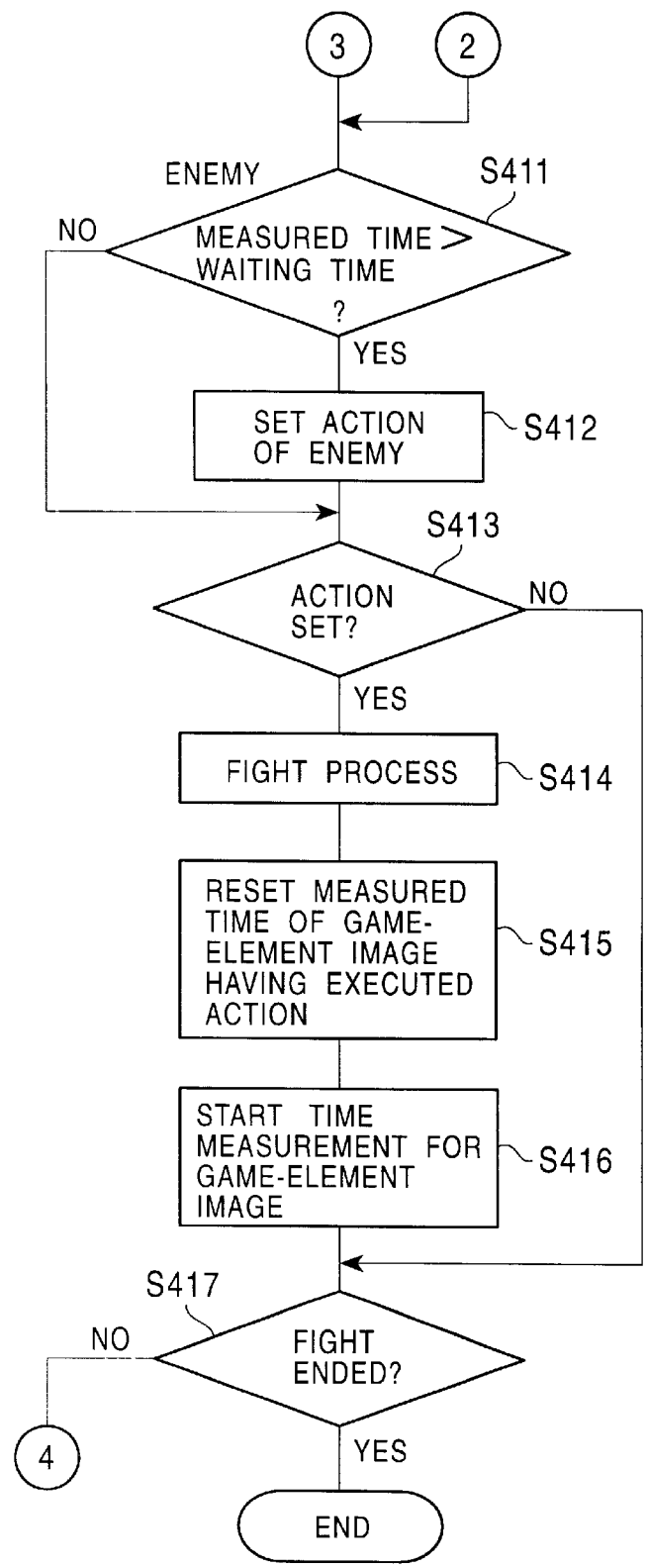
FIG. 21 is a continuation of the flow diagram of FIG. 20.

FIG. 20 and FIG. 21 are flow diagrams of a battle process in the second embodiment. The battle process is discussed, referring to FIG. 20, FIG. 21 and a display example shown in FIG. 22. A player character encounters an enemy character in the game with a predetermined probability. When both characters encounter, the battle process starts.

When the battle process starts, the controller unit 11 sets an opponent, and registers the set opponent in the "opponent and player character" section 32a in the fight control table 32 (step S401) as shown in FIG. 20.

The controller unit 11 starts time measurement, with a built-in timer, for all characters (including the player character) which participate in the fight (step S402). The time data being counted is stored in the "opponent and player character" section 32a in the fight control table 32.

The controller unit 11 and graphics processor 15 present a fight screen, with the player character and the enemy character appearing thereon, on the display screen 61 of the output unit 6 (step S403). Along with the fight screen, a predetermined sound is output from the output unit 6 by the audio processor 14.

Figure 22:
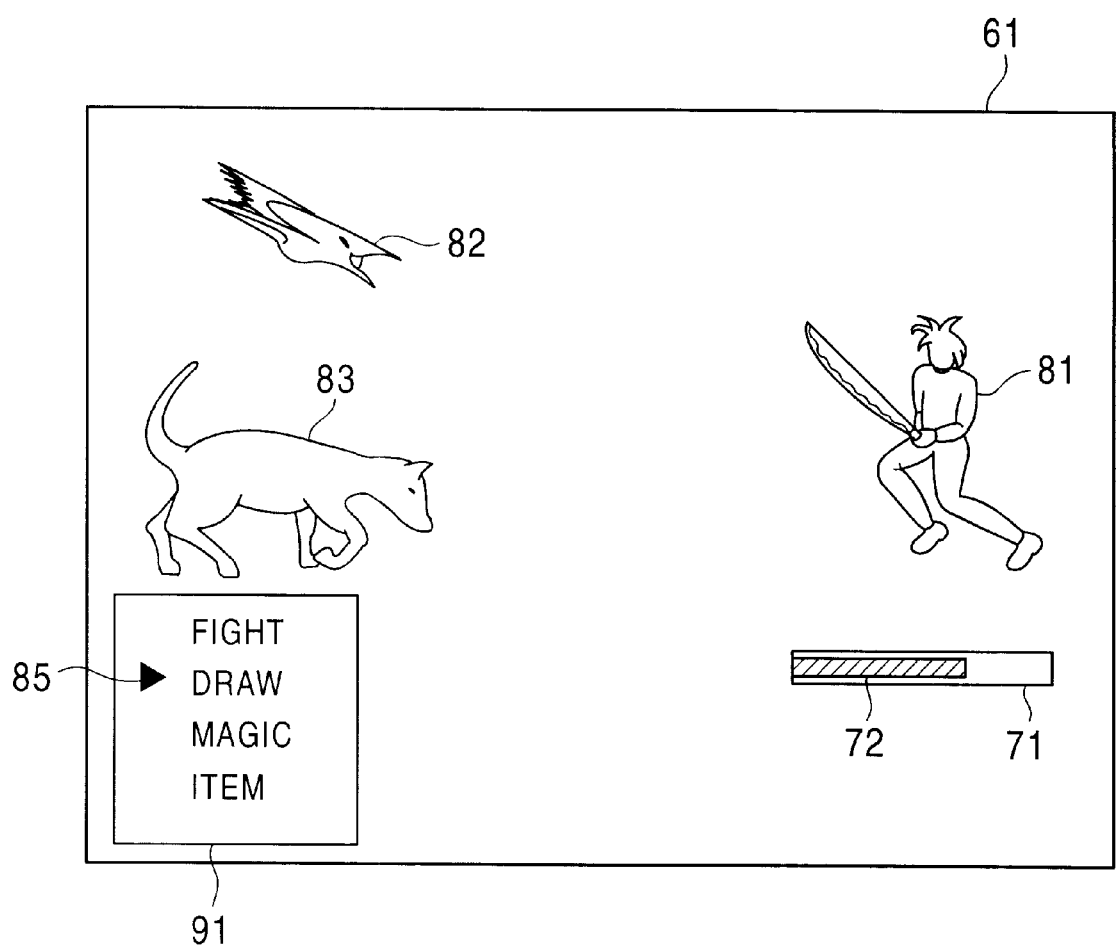
FIG. 22 shows an example of display presented in the battle process shown in FIG. 20.

Referring to FIG. 22, the display screen 61 presents a waiting-time gauge 71 and a meter bar 72 for allowing the player to visually recognize the set value of the waiting time and the time being counted. The waiting-time gauge 71 and meter bar 72 will be discussed later.

Returning to FIG. 20, the controller unit 11 references the waiting-time table 31, and determines whether the time being counted of the player character reaches the set value of the waiting time (step S404).

When the time being counted of the player character has reached the set value of the waiting time, the controller unit 11 and graphics processor 15 present a command window 91 on the display screen 61 as shown in FIG. 22 (step S405).

The player moves the icon presented within the command window 91 using the buttons on the input unit 3 to select any command from the command window 91.

The controller unit 11 remains on standby until the player selects the command (step S406). When the command is selected, the controller unit 11 determines whether the command is the "draw", the "magic" or "other process" (step S407).

When the player selects the "draw" command in the cursor operation, the draw process routine is performed (step S408). When the player selects the "magic" command, the magic process routine is performed (step S409).

When one of the other processes, such as "fight" and "item" commands, is selected, the process relating to the use of the item or the process for a fight (attack) using available weapons is executed (step S410). The draw process routine and magic process routine remain unchanged from those in the first embodiment.

When one of the processes (in steps S408, S409, and S410) selected by the player ends, or when the time being counted of the player character has not yet reached the set value of the waiting time, the controller unit 11 references the waiting-time table 31, and determines whether the timing being counted of each enemy character reaches the set value of the waiting time of each enemy character (step S411).

When the time being counted of any enemy character has reached the set value of the waiting time, the controller unit 11 sets the action of the enemy character which has reached the set value of the waiting time, in accordance with the action setting algorithm (sub-program) of the enemy character contained in the game program (step S412).

When the action is set for the player character and at least one enemy character (step S413), the controller unit 11, graphics processor 15 and audio processor 14 perform the graphic display control, the audio output control, and the fight arithmetic processing in accordance with the set action of the player character and the enemy character, and thus perform the fight process (step S414).

When times being counted of all enemy characters remain to reach the respective set values of waiting time in step S411, the controller unit 11 goes to step S413 without setting the action for the enemy characters in step S412.

The controller unit 11 resets the time being counted of the character, the action of which is executed in step S414, (step S415), and restarts time measurement (step S416).

In succession, the controller unit 11 determines whether the fight has ended (step S417). When the action of the player character and the enemy character is not set in step S413, the controller unit 11 determines whether the fight has ended (step S417), without performing the fight process in step S414, the resetting of the time in step S415, and the restart of the time measurement in step S416.

When the fight has not yet ended, namely, still in progress, the controller unit 11 returns to step S403, and repeats the subsequent steps.

FIG. 23A through FIG. 23D show the time elapse presented on the waiting-time gauge 71. The entire length of the waiting-time gauge 71 corresponds to the total time (overall count) from when the player character 81 has completed one action to when the player character 81 starts a next action. The meter bar 72 presented in the waiting-time gauge 71 represents the duration of time counted from the start of the fight, namely, from when the player character 81 has completed one action, in other words, present time being counted.

The meter bar 72 (i.e., hatched area) gradually extends rightward as the time counted increases as shown in FIG. 23A through FIG. 23D.

Figure 23A:
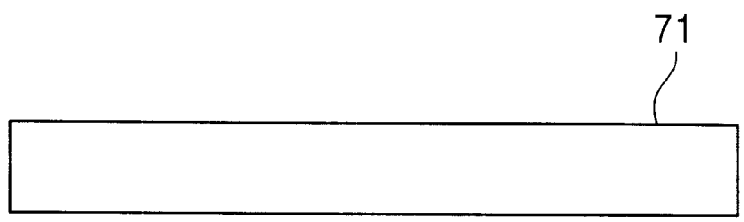
FIGS. 23A–23D shows an example of a waiting time gauge presented on screen in the battle process in accordance with the second embodiment.
Figure 23B:
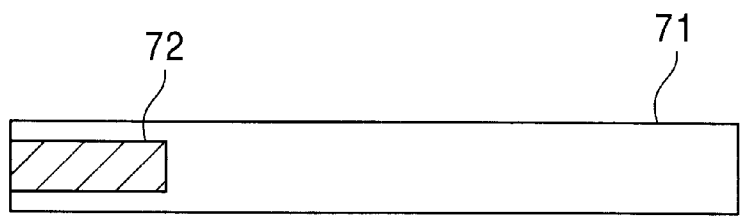
Figure 23C:
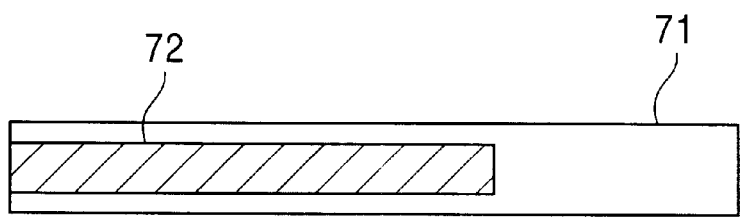
Figure 23D:
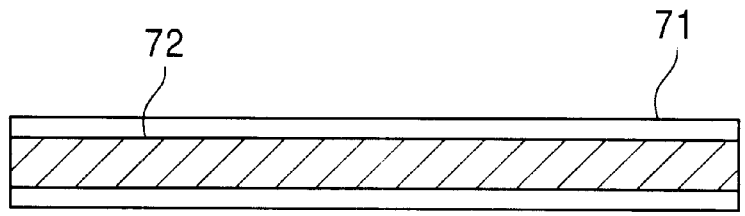

When the meter bar 72 extends, covering the entire length of the waiting-time gauge 71 as shown in FIG. 23D, the player character 81 can take a next action.

When the player character 81 executes the next action, the length of the meter bar 72 is reset, in other words, the time being counted is reset. The meter bar 72 returns to the state shown in FIG. 23A. The update of the display of the meter bar 72 is repeated in response to the time measurement process and the time measured.

Referring to information presented by the waiting-time gauge 71 and the meter bar 72, the player recognizes at a glance how long to wait before the player character 81 can execute a next action.

Besides the advantage presented by the first embodiment, the second embodiment accounts for time factor in the action timing of the characters in the fight session. A variation is introduced in the progress of the game and the entertainment value of the game is thus greatly enhanced.

The present invention has been discussed in connection with the above-referenced embodiments. The present invention is not limited to the above embodiments, and changes and modifications may be performed within the scope of the present invention.

In the discussion of the above embodiments, the present invention is implemented in a home game apparatus as a platform. The present invention may be implemented in a commercially available computer such as a personal computer or an arcade game apparatus, as a platform. The present invention may be implemented in a communications terminal as a platform, such as a portable telephone, a portable information terminal, or a car navigation system.

In the discussion of the above embodiments, the programs and the data for carrying out the present invention are stored in a CD-ROM as a storage medium. The storage medium is not limited to the CD-ROM. The storage medium may be other computer readable medium, such as magnetic storage medium, an optical storage medium (i.e., digital video disc), or a semiconductor memory.

The form of the supplying of the programs and data for carrying out the present invention is not limited to the storage medium, such as a CD-ROM, detachably mounted on a game apparatus or a computer. Specifically, the programs and data for carrying out the present invention may be downloaded from other apparatus on the network 100 via the communication line 99 and the communication interface 17 as shown in FIG. 1. The programs and data may be stored in other apparatus on the network 100 via the communication line 99, and may be stored in RAM 12, as necessary, via the communication line 99.

The description embodiments are only illustrative and various changes and modifications may be imparted thereto without departing from the scope of the invention which is limited solely by the appended claims.

What is claimed is:

1. A game apparatus for playing a fighting game between game characters on a display screen, the apparatus comprising:

storage means for storing fighting abilities on a per character basis;

selecting means for selecting, in response to a manual input, any fighting ability from among the fighting abilities which are stored on a per character basis and are presented on the display screen;

display control means which controls the displaying of a fight between the characters, using the fighting ability selected by the selecting means;

time measurement means for measuring a duration of time throughout which the display control means controls the displaying of the fight; and authorizing means for authorizing each character to execute a fighting action when the time measured by the time measurement means reaches the time predetermined for the character, wherein the selecting means selects the ability in response to a manual input when the authorizing means authorizes the character to execute the fighting action.

2. A game apparatus according to one of claim 1, wherein a magic art is a function of providing a variation to the ability of the character, and the fighting ability stored in the storage means is a magic art.

3. A game fight processing method for playing a fighting game between game characters on a display screen, the method comprising:

a first step for displaying, in response to a manual input, fighting abilities which are stored beforehand on a per character basis;

a second step for selecting, in response to a manual input, any fighting abilities from among the fighting abilities which are displayed in the first step;

a third step for registering any fighting abilities, selected in the second step, for a character in response to a manual input;

a fourth step for displaying the abilities, registered in the third step, in response to a manual input;

a fifth step for selecting any desired ability from among the abilities displayed in the fourth step;

a sixth step for controlling the displaying of a fight between the characters using the fighting ability selected in the second step, wherein the sixth step controls the displaying of the fight when any ability is selected in the second step or when any ability is selected in the fifth step;

a seventh step for measuring a duration of time throughout which the sixth step controls the displaying of the fight; and an eighth step for authorizing each character to execute a fighting action when the time measured in the seventh step reaches the time predetermined for the character, wherein each of the second step and the fifth step selects the ability in response to a manual input when the eighth step authorizes the fighting action.

4. The game fight processing method according to claim 3, wherein the sixth step controls the displaying of the fight when the second step selects any fighting abilities.

5. A game fight processing method according to claim 4, wherein a magic art is a function of providing a variation to the ability of the character, and the beforehand stored fighting ability is a magic art.

6. A computer readable storage medium storing a program for causing a computer to execute a game fight processing method for playing a fighting game between game characters on a display screen, the program comprising:

a first step for displaying, in response to a manual input, fighting abilities which are stored beforehand on a per character basis;

a second step for selecting, in response to a manual input, any fighting abilities from among the fighting abilities which are displayed in the first step;

a third step for registering any fighting abilities, selected in the second step, for a character in response to a manual input;

a fourth step for displaying the abilities, registered in the third step, in response to a manual input;

a fifth step for selecting any desired ability from among the abilities displayed in the fourth step, a sixth step for controlling a fight between the characters using the fighting ability selected in the second step, wherein the sixth step controls the displaying of the fight when any ability is selected in the second step or when any ability is selected in the fifth step;

a seventh step for measuring a duration of time throughout which the sixth step controls the displaying of the fight; and an eighth step for authorizing each character to execute a fighting action when the time measured in the seventh step reaches the time predetermined for the character, wherein each of the second step and the fifth step selects the ability in response to a manual input when the eighth step authorizes the fighting action.

7. The computer readable storage medium according to claim 6, wherein the sixth step controls the displaying of the fight when the second step selects any fighting abilities.

8. A computer readable storage medium according to claim 7, wherein a magic art is a function of providing a variation to the ability of the character, and the beforehand stored fighting ability is a magic art.

9. A computer data signal embodied in a carrier wave modulated with a program for causing a computer to execute a game fight processing method for playing a fighting game between game characters on a display screen, said carrier wave comprising:

a display source code segment comprising displaying, in response to a manual input, fighting abilities which are stored beforehand on a per character basis;

a selection source code segment comprising selecting, in response to a manual input, any fighting abilities from among the fighting abilities which are displayed in said display source code;

a control source code segment comprising controlling the displaying of a fight between the characters using the fighting ability selected in said selection source code segment;

a measurement source code segment comprising measuring a duration of time throughout which said control source code segment controls the displaying of the fight; and an authorization source code segment authorizing each character to execute a fighting action when the time measured in said measurement source code reaches the time predetermined for the character, wherein said selection source code segment selects the ability in response to a manual input when said authorization source code segment authorizes the fighting action.

10. The computer data signal according to claim 9, wherein a magic art is a function of providing a variation to the ability of the character, and the beforehand stored fighting ability is a magic art.

* * * * *

UNITED STATES PATENT AND TRADEMARK OFFICE
CERTIFICATE OF CORRECTION

PATENT NO. : 6,354,940 B1
DATED : March 12, 2002
INVENTOR(S) : H. Itou et al.

It is certified that error appears in the above-identified patent and that said Letters Patent is hereby corrected as shown below:

<u>Title page,</u>
Item [54], Title, "STORAGE" (second occurrence) should be -- STORING --.

<u>Column 16,</u>
Line 32, delete "one of".

Signed and Sealed this

Twenty-sixth Day of November, 2002

Attest:

Attesting Officer

JAMES E. ROGAN
*Director of the United States Patent and Trademark Office*